(12) United States Patent
Ong

(10) Patent No.: US 11,404,926 B2
(45) Date of Patent: Aug. 2, 2022

(54) ELECTRIC MACHINE WITH SIX LAYER HAIRPIN WINDING LAYOUT

(71) Applicant: MAGNA POWERTRAIN OF AMERICA, INC., Troy, MI (US)

(72) Inventor: Raymond Ong, Novi, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 141 days.

(21) Appl. No.: 16/646,679

(22) PCT Filed: Oct. 24, 2018

(86) PCT No.: PCT/US2018/057197
§ 371 (c)(1),
(2) Date: Mar. 12, 2020

(87) PCT Pub. No.: WO2019/084071
PCT Pub. Date: May 2, 2019

(65) Prior Publication Data
US 2020/0280230 A1    Sep. 3, 2020

Related U.S. Application Data

(60) Provisional application No. 62/684,480, filed on Jun. 13, 2018, provisional application No. 62/578,556, (Continued)

(51) Int. Cl.
*H02K 3/12* (2006.01)
*H02K 1/16* (2006.01)
(Continued)

(52) U.S. Cl.
CPC .............. *H02K 3/12* (2013.01); *H02K 1/165* (2013.01); *H02K 3/18* (2013.01); *H02K 3/28* (2013.01); *H02K 3/345* (2013.01); *H02K 15/064* (2013.01)

(58) Field of Classification Search
CPC .. H02K 3/12; H02K 3/18; H02K 3/28; H02K 3/345
See application file for complete search history.

(56) References Cited

U.S. PATENT DOCUMENTS 6,894,417 B2 * 5/2005 Cai .......................... H02K 3/12
310/198
9,379,586 B2 * 6/2016 Rahman ................... H02K 3/28
(Continued)

FOREIGN PATENT DOCUMENTS

| CN | 104247221 A | 12/2014 |
|---|---|---|
| JP | 2014090614 A | 5/2014 |
| JP | 2015023670 A | 2/2015 |

OTHER PUBLICATIONS

Chinese Search Report; Appl. No. 201880069174.X; dated Apr. 9, 2022; 8 pages.

*Primary Examiner* — Robert W Horn
(74) *Attorney, Agent, or Firm* — Dickinson Wright PLLC

(57) ABSTRACT

An electric machine is provided that includes a stator defining a rotor chamber and a plurality of stator slots disposed circumferentially about the stator. The stator includes a plurality of phase groups each including a plurality of circuits. Each circuit includes a plurality of winding sets of a plurality of phase conductors connected in series for carrying an alternating current voltage. A rotor is disposed in the rotor chamber for rotating relative to the stator. The phase conductors are laid in a plurality of layers of the plurality of stator slots. Stator slots that include phase conductors carrying different phases are shared slots and stator slots that include phase conductors carrying the same phase are same slots. The circuits are arranged with balanced quantities of same slots and shared slots for reducing stator losses at high rotational speeds of the rotor relative to the stator.

10 Claims, 22 Drawing Sheets

Related U.S. Application Data filed on Oct. 30, 2017, provisional application No. 62/577,105, filed on Oct. 25, 2017.

(51) Int. Cl.
*H02K 3/18* (2006.01)
*H02K 3/28* (2006.01)
*H02K 3/34* (2006.01)
*H02K 15/06* (2006.01)

(56) References Cited

U.S. PATENT DOCUMENTS

| | | | | |
|---|---|---|---|---|
| 10,505,424 | B2* | 12/2019 | Tamura | H02K 3/04 |
| 10,581,292 | B2* | 3/2020 | Neet | H02K 3/14 |
| 10,581,293 | B2* | 3/2020 | Neet | H02K 3/28 |
| 10,615,655 | B2* | 4/2020 | Neet | H02K 3/48 |
| 10,778,057 | B2* | 9/2020 | Aoyama | H02K 3/12 |
| 10,797,550 | B2* | 10/2020 | Saito | H02K 3/12 |
| 11,018,541 | B2* | 5/2021 | Neet | H02K 3/28 |
| 11,165,298 | B2* | 11/2021 | Husain | H02K 3/12 |
| 2011/0012466 | A1 | 1/2011 | Blissenbach et al. | |
| 2014/0285054 | A1* | 9/2014 | Han | H02K 3/28 |
| | | | | 310/201 |
| 2014/0319953 | A1* | 10/2014 | Rahman | H02K 3/12 |
| | | | | 310/198 |
| 2018/0183292 | A1* | 6/2018 | Lampic | H02K 1/16 |
| 2018/0248432 | A1* | 8/2018 | Ikeda | H02K 3/28 |
| 2020/0251947 | A1* | 8/2020 | Zuniga | H02K 3/00 |
| 2020/0280230 | A1* | 9/2020 | Ong | H02K 1/165 |
| 2021/0159743 | A1* | 5/2021 | Neet | H02K 3/12 |

* cited by examiner

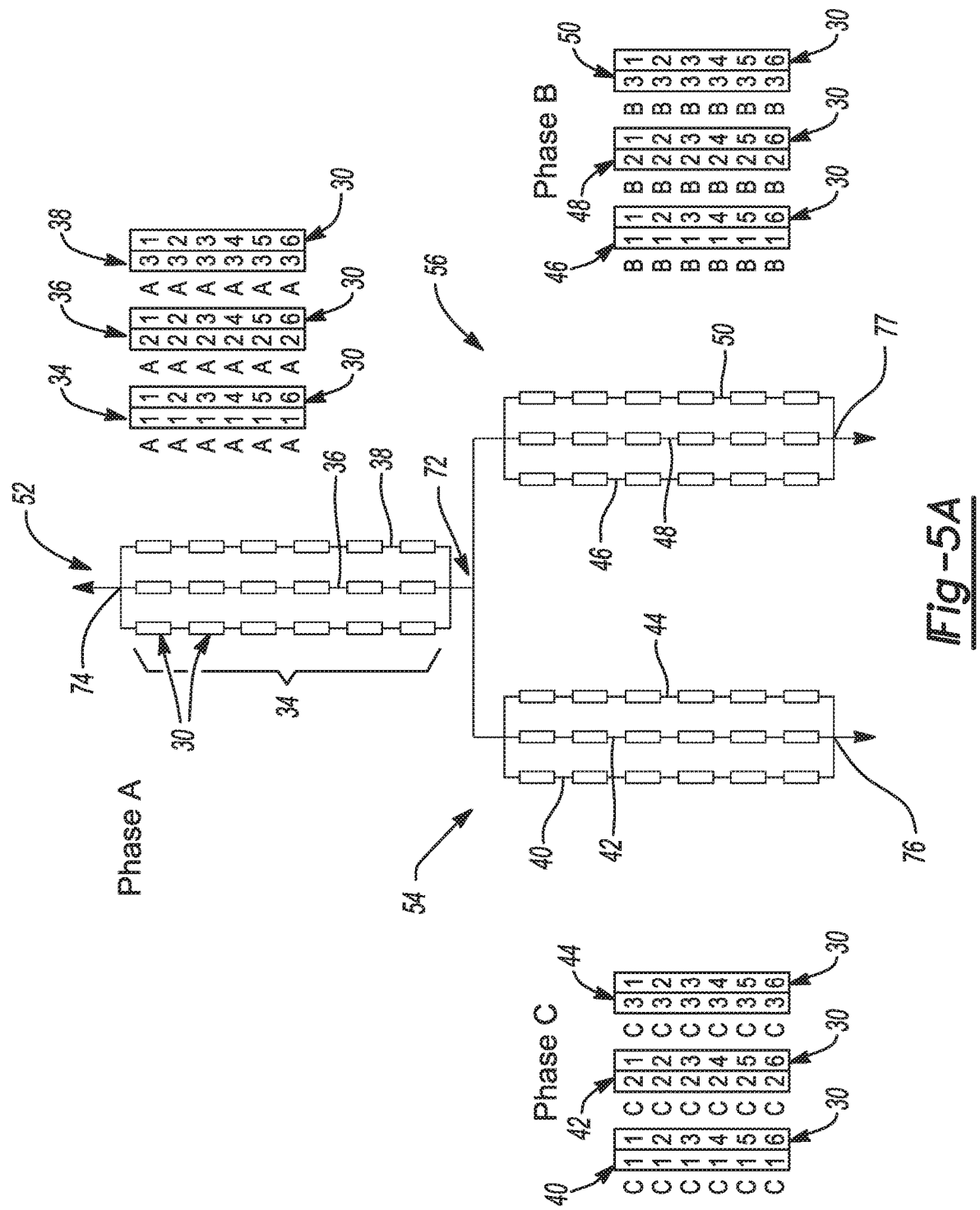

Optimized Winding Layout

Create a layout where parallel have same number of shared slots and same slots - i.e. parallel 1, parallel 2, parallel 3 each have 12 shared and 24 same Shared slots - two different phases in the slot Same slots - One phase in the slot Goal of parallel Circuits 1, 2 and 3 have same resistance value due to same length of wire

| Parallel 1 | | | | | | | |
|---|---|---|---|---|---|---|---|
| A 11 | SHARED | SHARED | same | SHARED | SHARED | SHARED | same |
| A 12 | same | same | same | same | same | same | same |
| A 13 | same | SHARED | SHARED | same | SHARED | SHARED | SHARED |
| A 14 | SHARED | same | same | SHARED | same | same | same |
| A 15 | same | same | SHARED | same | same | same | same |
| A 16 | same | SHARED | same | SHARED | same | SHARED | SHARED |

| Parallel 2 | | | | | | | |
|---|---|---|---|---|---|---|---|
| A 21 | SHARED | same | same | SHARED | same | SHARED | same |
| A 22 | same | same | SHARED | same | same | same | same |
| A 23 | same | SHARED | same | same | SHARED | same | SHARED |
| A 24 | SHARED | same | same | SHARED | same | SHARED | same |
| A 25 | same | SHARED | SHARED | same | same | SHARED | SHARED |
| A 26 | same | same | same | same | SHARED | same | same |

| Parallel 3 | | | | | | | |
|---|---|---|---|---|---|---|---|
| A 31 | SHARED | same | SHARED | same | SHARED | SHARED | same |
| A 32 | same | same | same | same | same | same | same |
| A 33 | same | SHARED | same | SHARED | same | SHARED | SHARED |
| A 34 | SHARED | same | SHARED | same | SHARED | same | same |
| A 35 | same | same | same | SHARED | same | same | SHARED |
| A 36 | same | SHARED | same | same | same | SHARED | same |

Fig-6

| Slot | 54 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Pole | Shared | Same | Same | Shared | | | N | | | Shared | Same | Same | Shared | | | S | | | Shared | Same |
| B1 sample 6 layers | | | | | | | | | | | | | | | | | | | | |
| Layer 1 | B31- | A13+ | A12+ | A11+ | C33- | C32- | C31- | B13- | B12- | B11+ | A21- | A22- | A23- | C13+ | C12+ | C11+ | B21- | B22- | B23- | A33+ |
| Layer 2 | A21+ | A22+ | A23+ | C13- | C12- | C11- | B21+ | B22+ | B23+ | A33- | A31- | A32- | C21+ | C22+ | C23+ | B33- | B32- | B31- | A13+ | A12+ |
| Layer 3 | B23- | A33+ | A32+ | A31+ | C23- | C22- | C21- | B33- | B32- | B31+ | A13- | A12- | A11- | C33+ | C32+ | C31+ | B13- | B12- | B11- | A21+ |
| Layer 4 | A14+ | A15+ | A16+ | C34- | C35- | C36- | B14+ | B15+ | B16+ | A26- | A25- | A24- | C14+ | C15+ | C16+ | B26- | B25- | B24- | A34+ | A35+ |
| Layer 5 | B16- | A26+ | A25+ | A24+ | C26- | C15- | C16- | B26+ | B25+ | B24+ | A34- | A35- | A36- | C16+ | C26+ | C26+ | B16- | B24- | B26- | A14+ |
| Layer 6 | A34+ | A35+ | A36+ | C26+ | C24+ | C24+ | B34+ | B35+ | B36+ | A14- | A15- | A16- | C34+ | C36+ | C36+ | B14- | B16- | B26+ | A26+ | A25+ |

| Slot | 28 | 29 | 30 | 31 | 32 | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|---|---|---|---|---|
| Pole | Same | Same | Shared | | | S | | | Same | Shared | Same | Same | Shared | | | N | | | Same | Same | Shared |
| | A13- | A12- | A11- | C33+ | C32+ | C31+ | B13- | B12- | B11- | A21+ | A22+ | A23+ | C13- | C12- | C11- | B21+ | B22+ | B23+ | A33- | A32- | A31- |
| | A22- | A23- | C13+ | C12+ | C22+ | B21- | B22- | B23- | A33+ | A32+ | A31+ | C21- | C22- | C23- | B33+ | B32+ | B31+ | A13- | A11- | C33+ |
| | A32- | C33+ | A31- | C23+ | C22+ | B21+ | B13+ | B22+ | B23+ | A13+ | A12+ | C21+ | C22+ | C23+ | B31+ | B12+ | B33+ | A12+ | A22- | C23- |
| | A16- | A24- | C34+ | C35+ | B14- | B15- | B16- | A26+ | A24+ | A25+ | C14- | C15- | C16- | B24- | B25- | B26- | A34+ | A35+ | A36+ | C26- |
| | A25- | C34- | A26- | C35+ | C36+ | B25+ | B26+ | B35+ | A24+ | C36+ | B34+ | C16+ | C15+ | C26+ | B25+ | B34+ | A24+ | A25+ | A36+ | C14- |
| | A35- | A26- | C26+ | C24+ | B34+ | B35+ | A14+ | A15+ | A15+ | A25+ | C34+ | C36+ | C35+ | B14+ | B15+ | B16+ | A25+ | A24+ | A14+ | C14+ |

*Fig-7A*

A11 example wire layout –
Slot 3 shared phases, Slot 12 same phase within slot, Slot 20 same, slot 30 shared, slot 39 shared, slot 47 shared –> therefore 4 shared, 2 same for A11 wire A21 example wire layout –
Slot 10 and 19 same phase, slot 27 shared, slot 37 and 46 same phase, and slot 54 shared –> therefore 4 same and 2 shared for A21 wire

62

| | N | | | | | | |
|---|---|---|---|---|---|---|---|
| Same | Shared | | | | | | Shared |
| 20 | 21 | 22 | 23 | 24 | 25 | 26 | 27 |
| | | | | | | | |
| A32+ | A31+ | C21- | C22- | C23- | B33+ | B32+ | B31+ |
| A11+ | C33- | C32- | C31- | B13+ | B12+ | B11+ | A21- |
| A22+ | A23+ | C13- | C12- | C11- | B21+ | B22+ | B23+ |
| A36+ | C26- | C25- | C24- | B34+ | B35+ | B36+ | A14- |
| A15+ | A16+ | C34- | C35- | C36- | B14+ | B15+ | B16+ |
| A24+ | C14- | C15- | C16- | B26+ | B25+ | B24+ | A34- |

A

64

| | S | | | | |
|---|---|---|---|---|---|
| 49 | 50 | 51 | 52 | 53 | 54 |
| | | | | | |
| C21+ | C22+ | C23+ | B33- | B32- | B31- |
| C32+ | C31+ | B13- | B12- | B11- | A21+ |
| C13+ | C12+ | C11+ | B21- | B22- | B23- |
| C25+ | C24+ | B34- | B35- | B36- | A14+ |
| C34+ | C35+ | C36+ | B14- | B15- | B16- |
| C15+ | C16+ | B26- | B25- | B24- | A34+ |

Fig-13A

B1 sample 6 layers (Slots 1-27)

| Slot | 54 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Pole | Shared | Same | Same | Shared | | | N | | | Shared | Same | Same | Shared | | | S | | | Shared | Same |
| Layer 1 | B12- | A31+ | A21+ | A11+ | C32- | C22- | C12- | B31+ | B21+ | B11+ | A32- | A22- | A12- | C31+ | C21+ | C11+ | B32- | B22- | B12- | A31+ |
| Layer 2 | A32+ | A22+ | A12+ | C31- | C21- | C11- | B22+ | B12+ | B11- | A31- | A21- | A11- | C32+ | C22+ | C12+ | B21- | B21- | B11- | B32+ | A22+ |
| Layer 3 | B14- | A33+ | A23+ | A13+ | C34- | C24- | C14- | B33+ | B23+ | B13+ | A34- | A24- | A14- | C33+ | C23+ | C13+ | B34- | B24- | B14+ | A33+ |
| Layer 4 | A34+ | A24+ | A14+ | C33- | C23- | C13- | B24+ | B14+ | B13- | A33- | A23- | A13- | C34+ | C24+ | C14+ | B23- | B23- | B13- | B34+ | A24+ |
| Layer 5 | B16- | A35+ | A25+ | A15+ | C36- | C26- | C16- | B35+ | B25+ | B15+ | A36- | A26- | A16- | C35+ | C25+ | C15+ | B36- | B26- | B16- | A35+ |
| Layer 6 | A36+ | A26+ | A16+ | C35- | C25- | C15- | B26+ | B16+ | B15- | A35- | A25- | A15- | C36+ | C26+ | C16+ | B25- | B25- | B15- | B36+ | A26+ |

(Slots 28-54)

| Pole | 28 | 29 | 30 | 31 | 32 | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|---|---|---|---|---|
| | Same | Same | Shared | | | S | | | Same | Shared | Same | Same | N | | | | Shared | Same | Same | Shared |
| | A32- | A22- | A12- | C31+ | C21+ | C11+ | B32- | B22- | B12- | A31+ | A21+ | A11+ | C32- | C22- | C12- | B31+ | B21+ | B11+ | A32- | A22- | A12- |
| | A21- | A11- | C32+ | C22+ | C12+ | B31- | B21- | B11- | A32+ | A22+ | A12+ | C31- | C21- | C11- | B32+ | B22+ | B12+ | A31- | A21- | A11- | C32- |
| | A34- | A24- | A14- | C33+ | C23+ | C13+ | B34- | B24- | B14- | A33+ | A23+ | A13+ | C34- | C24- | C14- | B33+ | B23+ | B13+ | A34- | A24- | A14- |
| | A23- | A13- | C34+ | C24+ | C14+ | B33- | B23- | B13- | A34+ | A24+ | A14+ | C33- | C23- | C13- | B34+ | B24+ | B14+ | A33- | A23- | A13- | C34- |
| | A36- | A26- | A16- | C35+ | C25+ | C15+ | B36- | B26- | B16- | A35+ | A25+ | A15+ | C36- | C26- | C16- | B35+ | B25+ | B15+ | A36- | A26- | A16- |
| | A25- | A15- | C36+ | C26+ | C16+ | B35- | B25- | B15- | A36+ | A26+ | A16+ | C35- | C25- | C15- | B36+ | B26+ | B16+ | A35- | A25- | A15- | C36- |

A11 example wire layout –
Slot 3 shared phases, Slot 11 same phase within slot, Slot 21 shared, slot 29 same, slot 39 shared, slot 47 same -> therefore vary slot to slot for A11 wire A21 example wire layout –
Slot 2, 10, 20, 28, 38 and 46 all have same phase

| | 162 N | | | | | | |
|---|---|---|---|---|---|---|---|
| Same | Shared | | | | | | Shared |
| 20 | 21 | 22 | 23 | 24 | 25 | 26 | 27 |
| A21+ | A11+ | C32- | C22- | C12- | B31+ | B21+ | B11+ |
| A12+ | C31- | C21- | C11- | B32+ | B22+ | B12+ | A31- |
| A23+ | A13+ | C34- | C24- | C14- | B33+ | B23+ | B13+ |
| A14+ | C33- | C23- | C13- | B34+ | B24+ | B14+ | A33- |
| A25+ | A15+ | C36- | C26- | C16- | B35+ | B25+ | B15+ |
| A16+ | C35- | C25- | C15- | B36+ | B26+ | B16+ | A35- |

A

| 164 S | | | | | |
|---|---|---|---|---|---|
| 49 | 50 | 51 | 52 | 53 | 54 |
| C31+ | C21+ | C11+ | B32- | B22- | B12- |
| C22+ | C12+ | B31- | B21- | B11- | A32+ |
| C33+ | C23+ | C13+ | B34- | B24- | B14- |
| C24+ | C14+ | B33- | B23- | B13- | A34+ |
| C35+ | C25+ | C15+ | B36- | B26- | B16- |
| C26+ | C15+ | B35- | B25- | B15- | A36+ |

| Yoke | | shared | same | same | shared | same | same | shared | same | same | shared | same | same | shared | same | same | shared |
|---|---|---|---|---|---|---|---|---|---|---|---|---|---|---|---|---|---|
| | | 54 | 1 | 2 | 3 | 4 | 5 | 6 | 7 | 8 | 9 | 10 | 11 | 12 | 13 | 14 | 15 | 16 | 17 |
| | Layer 1 | B31,2- | A31,1+ | A21,1+ | A11,1+ | C21,2- | C11,2- | C31,2- | B31,1+ | B21,1+ | B11,1+ | A11,1- | A31,2- | A21,2- | C31, | C21,1+ | B11,2- | B31,2- |
| | Layer 2 | A11,2+ | A31,2+ | A21,2+ | C31,1- | C21,1- | C11,1- | B11,2+ | B31,2+ | B21,2+ | A21,1- | A11,4- | A31,1- | C11,2- | C31, | C21,2+ | B11,1- | B31,1- |
| | Layer 3 | B31,4- | A31,3+ | A21,3+ | A11,3+ | C21,4- | C11,4- | C31,4- | B31,3+ | B11,3+ | B11,3+ | A11,4- | A31,4- | A21,4- | C31, | C21,3+ | B11,4- | B31,4- |
| | Layer 4 | A11,4+ | A31,4+ | A21,4+ | C31,1- | C21,3- | C11,3- | B11,4+ | B31,4+ | B21,4+ | A21,3- | A11,3- | A31,3- | C11,4- | C31, | C21,4+ | B11,3- | B31,3- |
| | Layer 5 | B31,6- | A31,5+ | A21,5+ | A11,5+ | C21,6- | C11,6- | C31,6- | B31,5+ | B21,5+ | B11,5+ | A11,6- | A31,6- | A21,6- | C31, | C21,5+ | B11,6- | B31,6- |
| Air Gap | Layer 6 | A11,6+ | A31,6+ | A21,6+ | C31,1- | C21,5- | C11,5- | B11,6+ | B31,6+ | B21,6+ | A21,5- | A11,5 | A31,5- | C11,6- | C31, | C21,6+ | B11,5- | B31,5- |

| Yoke | shared | same | same | shared | same | same | shared | same | same | shared | same | same | shared | same | same | shared |
|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 | 34 | 35 | 36 |
| | B21,2- | A21,1+ | A11,1+ | A31,1+ | C11,2- | C31,2- | C21,2- | B21,1+ | B11,1+ | B31,1+ | A11,1- | A31,2- | A21,2- | A21,2- | C11,1+ | C31,1+ | B21,2- | B11,2- |
| | A31,2+ | A21,2+ | A11,2+ | C11,1- | C31,1- | C21,1- | B21,2+ | B11,2+ | B31,2+ | A11,1- | A31,1- | A21,1- | A21,2- | C21,2+ | C11,2+ | B21,1- | B11,1- |
| | B21,4- | A21,3+ | A11,3+ | A31,3+ | C11,4- | C31,4- | C21,4- | B21,3+ | B11,3+ | B31,3+ | A11,3- | A31,4- | A21,4- | A21,3- | C11,3+ | C31,3+ | B21,4- | B11,4- |
| | A31,4+ | A21,4+ | A11,4+ | C11,3- | C31,3- | C21,3- | B21,4+ | B11,4+ | B31,4+ | A11,3- | A31,3- | A21,3- | A21,4- | C21,4+ | C11,4+ | B21,3- | B11,3- |
| | B21,6- | A21,5+ | A11,5+ | A31,5+ | C11,6- | C31,6- | C21,6- | B21,5+ | B11,5+ | B31,5+ | A11,5- | A31,6- | A21,6- | A21,5- | C11,5+ | C31,5+ | B21,6- | B11,6- |
| Air Gap | A31,6+ | A21,6+ | A11,6+ | C11,5- | C31,5- | C21,5- | B21,6+ | B11,6+ | B31,6+ | A11,5- | A31,5- | A21,5- | A21,6- | C21,6+ | C11,6+ | B21,5- | B11,5- |

| Yoke | shared | same | same | shared | same | same | shared | same | same | shared | same | same | shared | same | same | shared |
|---|---|---|---|---|---|---|---|---|---|---|---|---|---|---|---|---|
| | 37 | 38 | 39 | 40 | 41 | 42 | 43 | 44 | 45 | 46 | 47 | 48 | 49 | 50 | 51 | 52 | 53 | 54 |
| | A11,1+ | A31,1+ | A21,1+ | C31,2- | C21,2- | C11,2- | B11,1+ | B31,1+ | B21,1+ | A21,2- | A11,1- | A31,2- | C11,1+ | C31,1+ | C21,1+ | B21,2- | B31,2- |
| | A11,2+ | A31,2+ | C11,1- | C21,1- | C11,1- | B11,2+ | B31,2+ | B21,2+ | A31,1- | A21,1- | A11,2- | C21,2+ | C31,2+ | C11,2+ | B21,1- | B11,1- | A11,2+ | B31,1- |
| | A11,3+ | A31,3+ | A21,3+ | C31,4- | C21,4- | C11,4- | B11,3+ | B31,3+ | B21,3+ | A21,3- | A11,3- | A31,4- | C11,3+ | C31,3+ | C21,3+ | B21,4- | B31,4- |
| | A11,4+ | A31,4+ | C11,3- | C21,3- | C11,3- | B11,4+ | B31,4+ | B21,4+ | A31,3- | A21,3- | A11,4- | C21,4+ | C31,4+ | C11,4+ | B21,3- | B11,3- | A11,4+ | B31,3- |
| | A11,5+ | A31,5+ | A21,5+ | C31,6- | C21,6- | C11,6- | B11,5+ | B31,5+ | B21,5+ | A21,5- | A11,5- | A31,6- | C11,5+ | C31,5+ | C21,5+ | B21,6- | B31,6- |
| Air Gap | A11,6 | A31,6+ | C11,5- | C31,5- | C21,5- | B21,6+ | B11,6+ | B31,6+ | A11,5- | A21,5- | C21,6+ | C31,6+ | C11,6+ | B21,5- | B11,5- | A11,6+ |

A11 example wire layout – Slot 3 shared, Slot 10 same, Slot 20 Same, Slot 27 shared, Slot 37 Same, Slot 47 Same
2 Shared (3, 27) and 4 same (10, 20, 37, 47) but overall parallel circuit still balanced

ELECTRIC MACHINE WITH SIX LAYER HAIRPIN WINDING LAYOUT

CROSS REFERENCE TO RELATED APPLICATIONS

This application is a U.S. National Stage of International Application No. PCT/US2018/057197, filed on Oct. 24, 2018, which claims the benefit of and priority to U.S. Provisional Patent Application Ser. No. 62/577,105, filed Oct. 25, 2017 and U.S. Provisional Patent Application Ser. No. 62/578,556, filed Oct. 30, 2017 and U.S. Provisional Patent Application Ser. No. 62/684,480, filed Jun. 13, 2018, the entire disclosures of each of which are incorporated herein by reference.

FIELD

The present disclosure relates generally to an electric machine and, more particularly to an electric machine with a six layer hairpin winding layout.

BACKGROUND

This section provides background information related to the present disclosure which is not necessarily prior art.

Vehicles with traction motors offer the promise of powered transportation while producing reduced or no emissions. While some vehicles include only a traction or electric motor, other vehicles, known as hybrid vehicles include both a traction motor and an internal combustion engine. In both cases, energy may be stored in an on-board battery pack. Hybrid vehicles having both a traction motor and an internal combustion engine, can utilize the internal combustion engine to assist the traction motor in driving the wheels (a parallel hybrid), or may utilize the internal combustion engine to solely to charge the on-board battery pack, thereby extending the operating range of the vehicle (a series hybrid).

In some vehicles, there is a single, centrally-positioned electric motor that powers one or more of the vehicle wheels, and in other vehicles, one or more of the wheels have an electric motor (referred to sometimes as a hub motor) positioned at each driven wheel. The electric motors typically include a stationary stator with a plurality of stator slots disposed circumferentially about the stator. Windings are located within the stator slots and carry an alternating current voltage. A rotor is disposed in the stator for rotating relative to the stator in response to the alternating current voltage carried by the windings.

While currently proposed and existing vehicles are advantageous in some respects over those powered with only internal-combustion engines, there can be problems associated with some such vehicles. One such problem can be that their range is typically relatively short as compared to internal combustion engine-powered vehicles. This is particularly true for vehicles not equipped with range extender internal combustion engines. A reason for their typically relatively short range is the weight and cost of the battery packs used to store energy for the operation of such vehicles. Therefore, it would be beneficial to provide technology that improves the efficiency with which power is used in the operation of the electric or traction motor, so as to improve the range of such vehicles.

Additionally, increased motor peak speed is generally desirable for such motors or electric machines. However, high speeds can lead to increased heat due to losses in the windings of the stator and the increased current conducted through the windings necessary for the high speed rotation of the rotor. Therefore, it can be advantageous to overcome heat generation by reducing winding losses. Accordingly, there remains a need for an improved electric machine that overcomes these shortcomings.

SUMMARY

This section provides a general summary of the present disclosure and is not a comprehensive disclosure of its full scope or all of its features and advantages.

It is an object of the present disclosure to provide an electric machine that addresses and overcomes the above-noted shortcomings. The electric machine includes a stator extending annularly about and along an axis. The stator has a substantially cylindrical interior defining a rotor chamber. The stator also includes a plurality of stator slots disposed circumferentially and in a spaced relationship about the stator. The stator includes a plurality of phase groups each including a plurality of circuits. The plurality of circuits each includes a plurality of winding sets of a plurality of phase conductors connected in series for carrying an alternating current voltage. Each of the plurality of phase conductors of one of the plurality of phase groups carries the alternating current voltage with a phase difference compared to the plurality of phase conductors of another one of the plurality of phase groups. A rotor extends axially and is disposed in the rotor chamber for rotating relative to the stator in response to the alternating current voltages carried by each of the plurality of phase conductors. The plurality of phase conductors are laid in a plurality of layers of the plurality of stator slots, wherein the plurality of stator slots that include at least one of the plurality of phase conductors carrying the alternating current voltage with another one of the plurality of phase conductors carrying the alternating current voltage with the phase difference are shared slots. The plurality of stator slots that include the plurality of phase conductors carrying the alternating current voltage with another one of the plurality of phase conductors carrying the alternating current voltage with no phase difference are same slots. The plurality of circuits are each arranged within the plurality of layers in the plurality of stator slots with balanced quantities of the same slots and the shared slots for reducing stator losses at high rotational speeds of the rotor relative to the stator.

According to another aspect of the disclosure, an electric machine is provided that includes a stator extending annularly about and along an axis and having a substantially cylindrical interior defining a rotor chamber and a plurality of stator slots disposed circumferentially and in a spaced relationship about the stator. The stator includes a plurality of phase groups each including a plurality of circuits. The plurality of circuits each include a plurality of winding sets of a plurality of phase conductors connected in series for carrying an alternating current voltage. A rotor extends axially and is disposed in the rotor chamber for rotating relative to the stator in response to the alternating current voltage carried by each of the plurality of phase conductors. The plurality of phase conductors are laid in a plurality of layers of the plurality of stator slots. The plurality of phase groups includes a first phase group having a first phase resistance and a second phase group having a second phase resistance and a third phase group having a third phase resistance and the first phase resistance and the second phase resistance and the third phase resistance are all equal.

According to yet another aspect of the disclosure, an electric machine is provided that includes a stator extending annularly about and along an axis and having a substantially cylindrical interior defining a rotor chamber and a plurality of stator slots disposed circumferentially and in a spaced relationship about the stator. The stator includes a plurality of phase groups each including a plurality of circuits. The plurality of circuits each include a plurality of winding sets of a plurality of phase conductors connected in series for carrying an alternating current voltage. Each of the plurality of phase conductors of one of the plurality of phase groups carries the alternating current voltage with a phase difference compared to the plurality of phase conductors of another one of the plurality of phase groups. A rotor extends axially and is disposed in the rotor chamber for rotating relative to the stator in response to the alternating current voltage carried by each of the plurality of phase conductors. The plurality of phase conductors are laid in a plurality of layers of the plurality of stator slots. The plurality of stator slots that include at least one of the plurality of phase conductors carrying the alternating current voltage with another one of the plurality of phase conductors carrying the alternating current voltage with the phase difference are shared slots. The plurality of stator slots that include the plurality of phase conductors carrying the alternating current voltage with another one of the plurality of phase conductors carrying the alternating current voltage with no phase difference are same slots. The plurality of winding sets each extend through a first predetermined quantity of the same slots and a second predetermined quantity of the shared slots. The second predetermined quantity of the shared slots being less than the first predetermined quantity of the same slots.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5A illustrates the plurality of phase conductors including a plurality of series sets of a plurality of circuits arranged in a Y configuration;

FIGS. 6 and 7A-7B illustrate an arrangement of the plurality of circuits arranged within a plurality of layers of the plurality of stator slots with balanced quantities of same slots and shared slots for the first example embodiment of the electric machine according to aspects of the disclosure;

FIG. 8 illustrates a plurality of hairpin conductors in a winding set of the electric machine according to aspects of the disclosure;

FIGS. 12 and 13A-13B illustrate an arrangement of the plurality of circuits arranged within the plurality of layers of the plurality of stator slots with unbalanced quantities of same slots and shared slots for a second example embodiment of the electric machine according to aspects of the disclosure;

FIG. 17 and FIG. 18 illustrate an alternative arrangement of the plurality of circuits arranged within the plurality of layers of the plurality of stator slots for a third example embodiment of the electric machine according to aspects of the disclosure.

DETAILED DESCRIPTION

In the following description, details are set forth to provide an understanding of the present disclosure. In some instances, certain circuits, structures and techniques have not been described or shown in detail in order not to obscure the disclosure.

In general, the present disclosure relates to an electric machine of the type well-suited for use in many applications. The electric machine of this disclosure will be described in conjunction with one or more example embodiments. However, the specific example embodiments disclosed are merely provided to describe the inventive concepts, features, advantages and objectives will sufficient clarity to permit those skilled in this art to understand and practice the disclosure. Specifically, the example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
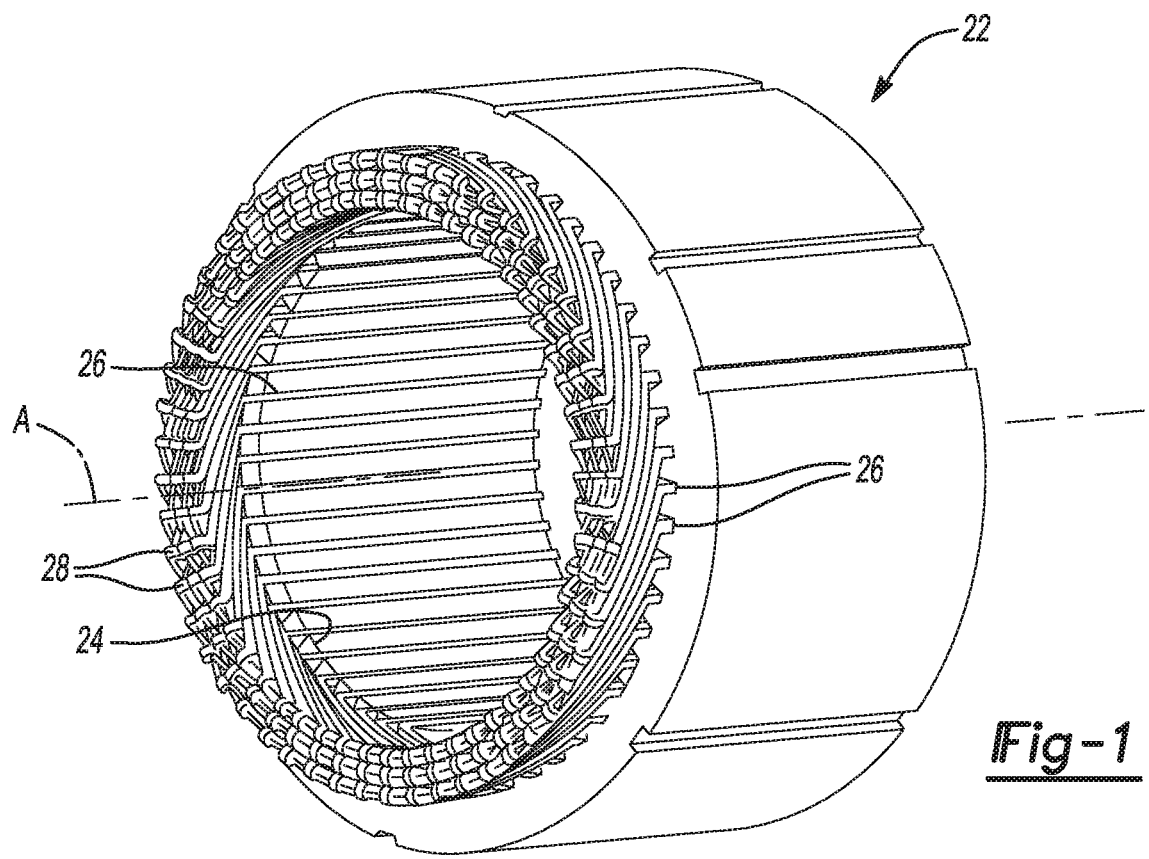
FIG. 1 is a front perspective view of a stator of first example embodiment of an electric machine according to aspects of the disclosure.
Figure 2:
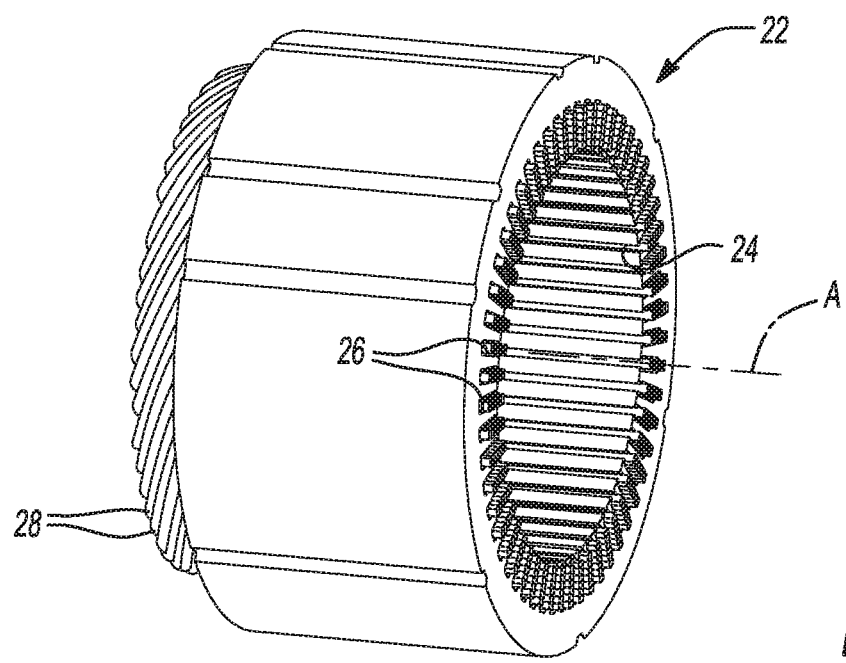
FIG. 2 is a side perspective view of the stator of the first example embodiment of the electric machine according to aspects of the disclosure.

Referring to the Figures, wherein like numerals indicate corresponding parts throughout the several views, an example first embodiment of the electric machine 20 is shown in FIGS. 1-8. Referring initially to FIGS. 1 and 2, the electric machine 20 includes a stator 22 extending annularly about and along an axis A. The stator 22 has a substantially cylindrical interior that defines a rotor chamber 24. The stator 22 also includes a plurality of stator slots 26 disposed circumferentially and in a spaced relationship about the stator 22. In more detail, the plurality of stator slots 26 open inwardly to the rotor chamber 24. According to an aspect, the electric stator 22 defines fifty four (54) stator slots 26, however, it should be appreciated that more or fewer stator slots 26 could be utilized.

Figure 3:
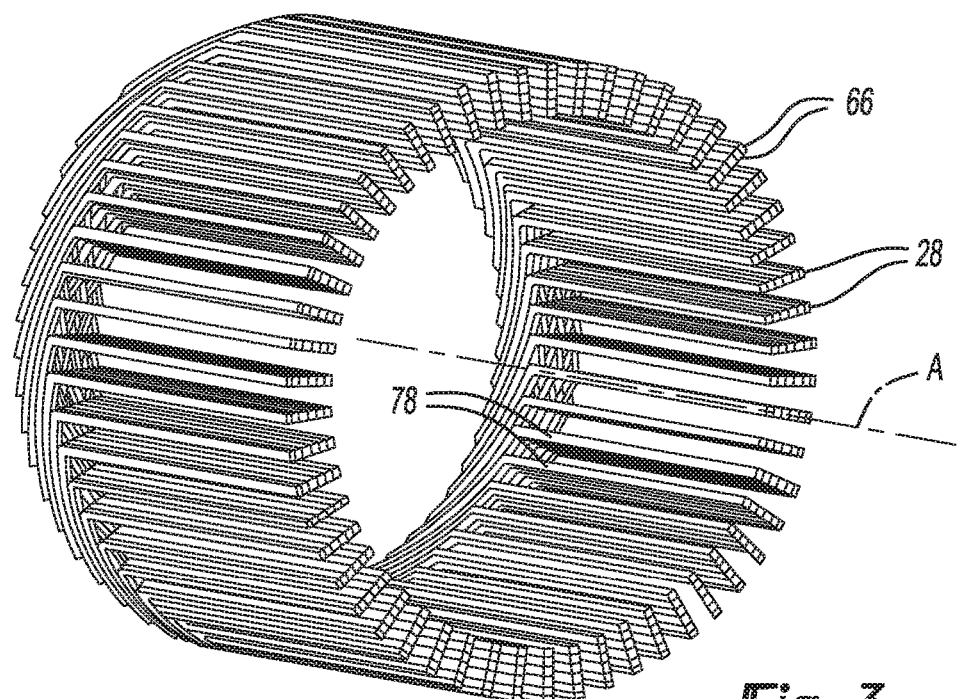
FIG. 3 is a perspective view of a plurality of phase conductors of the stator of the first example embodiment of the electric machine according to aspects of the disclosure.
Figure 4:
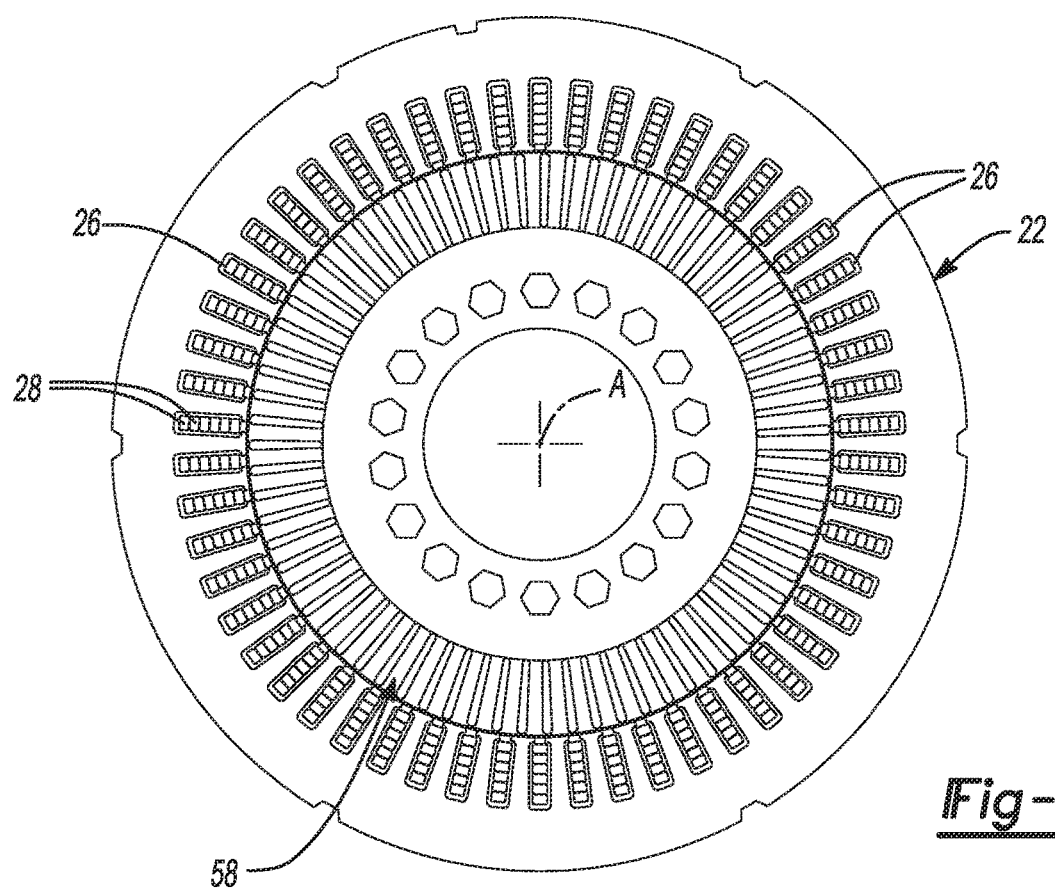
FIG. 4 is a cross-sectional view of the first example embodiment of the electric machine illustrating a plurality of stator slots of the stator and a rotor within the stator according to aspects of the disclosure.
Figures 7B, 8:
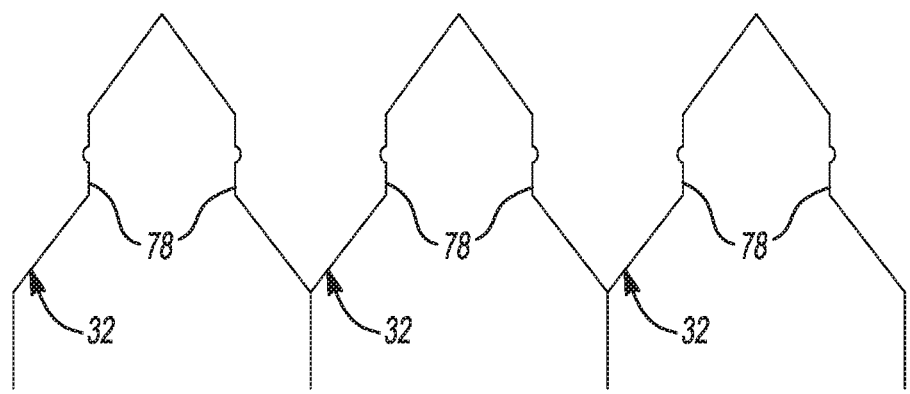

As best shown in FIGS. 3 and 4, the stator 22 additionally includes a plurality of phase conductors 28. The plurality of phase conductors 28 comprise a plurality of winding sets 30 and each winding set 30 is made up of phase conductors 28 each formed of three (3) hairpin conductors 32 (FIG. 8). Nevertheless, it should be understood that any number of hairpin conductors 32 may be used.

Figure 5B:
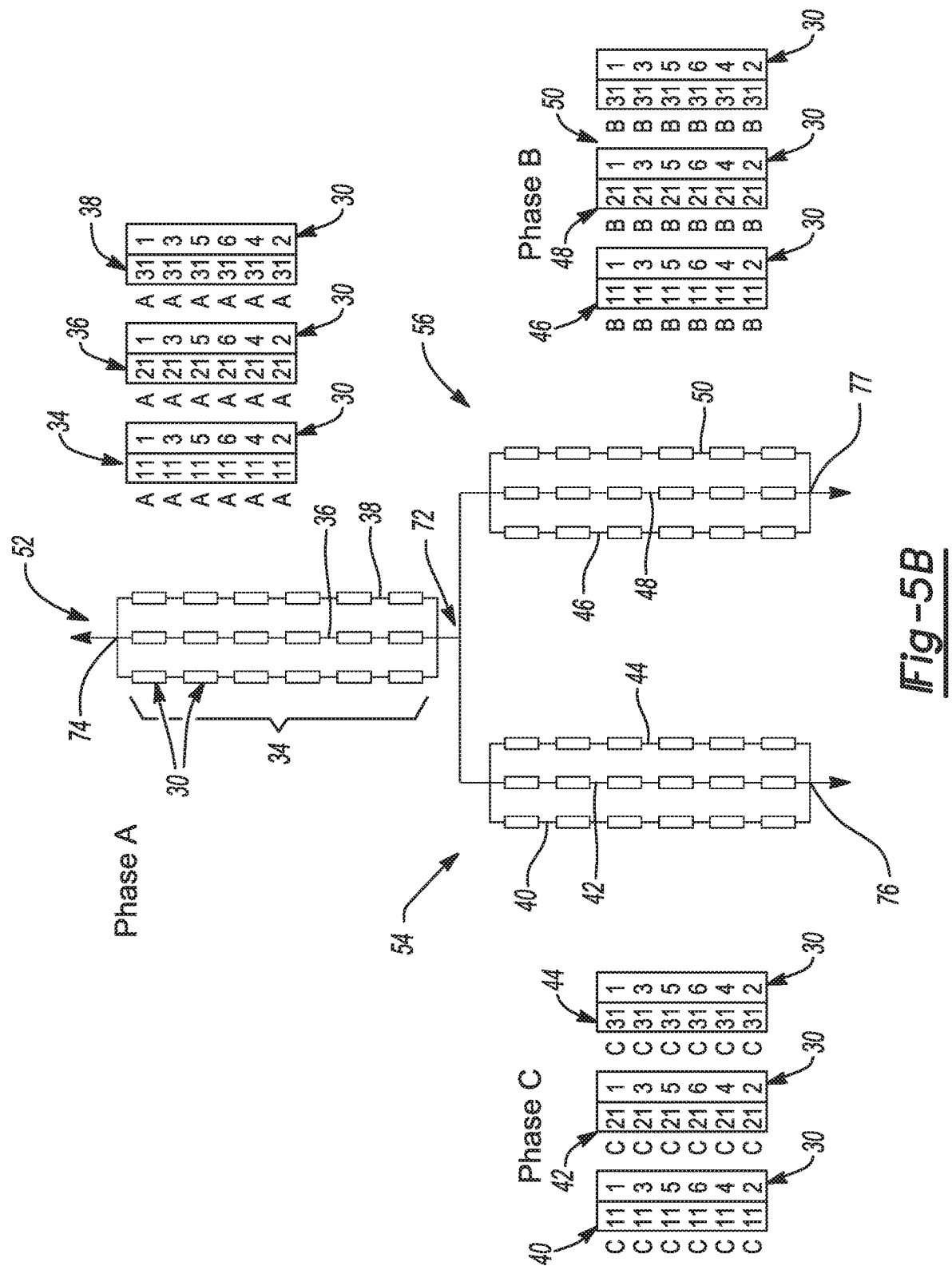
FIG. 5B illustrates the plurality of phase conductors including a plurality of series sets of a plurality of circuits arranged in a Y configuration and with an alternative circuit name nomenclature.

As best shown in FIGS. 5A and 5B, the plurality of winding sets 30 make up a plurality of circuits 34, 36, 38, 40, 42, 44, 46, 48, 50 for each carrying an alternating current voltage. The plurality of circuits 34, 36, 38, 40, 42, 44, 46, 48, 50 are grouped into a plurality of phases or phase groups 52, 54, 56. According to an aspect, each of the plurality of phase groups 52, 54, 56 includes three parallel circuits (chosen from the plurality of circuits 34, 36, 38, 40, 42, 44, 46, 48, 50) and each of these parallel circuits consists of six (6) series connected winding sets 30. Each of the phase groups 52, 54, 56 of three parallel circuits carries the alternating current voltage with a phase difference compared to another one of the phase groups 52, 54, 56 of three parallel circuits of a different phase or phase group. While the plurality of circuits 34, 36, 38, 40, 42, 44, 46, 48, 50 are arranged in the phase groups in parallel, as three parallel circuits in each phase group 52, 54, 56 shown in FIGS. 5A and 5B, it should be appreciated that other arrangements of the plurality of circuits 34, 36, 38, 40, 42, 44, 46, 48, 50 can be utilized. Phase A (i.e., phase group 52), Phase B (i.e., phase group 56), and Phase C (i.e., phase group 54) indicated in FIGS. 5A-7 all carry the alternating current voltages with differing phases (each phase group 52, 54, 56 has a different phase as compared to each other).

Referring back to FIG. 4, a rotor 58 extends axially and is disposed in the rotor chamber 24 for rotating relative to the stator 22 in response to the alternating current voltage carried by of each of the plurality of phase conductors 28. An air gap 60 is defined between the rotor 58 and the stator 22.

As best shown in FIGS. 7A-7B, the stator 22 includes a plurality of North poles 62 and a plurality of South poles 64, with one of the plurality of North poles 62 and one of the plurality of South poles 64 defining one pole pair of the electric machine 20. As shown, the six pole electric machine 20 has three pole pairs. Thus, according to an aspect of the disclosure, there are three North poles 62 and three South poles 64, for a total of six poles 62, 64 of the stator 22; however, other quantities of North poles 62 and South poles 64 may be utilized. The plurality of circuits 34, 36, 38, 40, 42, 44, 46, 48, 50 extending through the plurality of stator slots 26 consist of the phase conductors 28 laid in layers 66 within the plurality of the stator slots 26. According to an aspect of the disclosure, there are six layers 66 (shown in FIG. 4), with layer one disposed in an outermost portion of the plurality of stator slots 26 and layer six being disposed in an innermost portion of the plurality of stator slots 26. It should be understood that more or fewer layers 66 could instead be utilized.

The stator slots 26 that include at least one of the plurality of phase conductors 28 carrying the alternating current voltage with another one of the plurality of phase conductors 28 carrying the alternating current voltages with the phase difference (i.e., different phase) are shared slots 68. Conversely, the stator slots 26 that include the plurality of phase conductors 28 carrying the alternating current voltage with another one of the plurality of phase conductors 28 carrying the alternating current voltages with no phase difference are same slots 70. According to an aspect of the disclosure, the phase conductors 28 are connected in a "Y" configuration (i.e., the phase groups 52, 54, 56 are connected to one another in the "Y" configuration).

As best shown in FIG. 5A, the first phase group 52 includes a first primary parallel circuit 34 (i.e., Parallel 1 in FIG. 6) of the plurality of winding sets 30 (e.g., A11, A12, A13, A14, A15, A16) connected in series with one another from a central phase node 72 to a first phase source node 74. The first phase group 52 includes a first secondary parallel circuit 36 (i.e., Parallel 2 in FIG. 6) of the plurality of winding sets 30 (e.g., A21, A22, A23, A24, A25, A26) connected in series with one another from the central phase node 72 to the first phase source node 74. The first phase group 52 also includes a first tertiary parallel circuit 38 (i.e., Parallel 3 in FIG. 6) of the plurality of winding sets 30 (e.g., A31, A32, A33, A34, A35, A36) connected in series with one another from the central phase node 72 to the first phase source node 74. Circuits 34, 36, 38 of the first phase group 52 are in parallel with one another; however, other arrangements of the circuits 34, 36, 38, for example, may be contemplated.

Similarly, the second phase group 54 includes a second primary parallel circuit 40 of the plurality of winding sets 30 (e.g., B11, B12, B13, B14, B15, B16) connected in series with one another from the central phase node 72 to a second phase source node 76. The second phase group 54 also includes a second secondary parallel circuit 42 of the plurality of winding sets 30 (e.g., B21, B22, B23, B24, B25, B26) connected in series with one another from the central phase node 72 to the second phase source node 76 and a second tertiary parallel circuit 44 of the plurality of winding sets 30 (e.g., B31, B32, B33, B34, B35, B36) connected in series with one another from the central phase node 72 to the second phase source node 76. Circuits 40, 42, 44 of the second phase group 54 are in parallel with one another.

Finally, the third phase group 56 includes a third primary parallel circuit 46 of the plurality of winding sets 30 (e.g., C11, C12, C13, C14, C15, C16) connected in series with one another from the central phase node 72 to a third phase source node 77. The third phase group 56 includes a third secondary parallel circuit 48 of the plurality of winding sets 30 (e.g., C21, C22, C23, C24, C25, C26) connected in series with one another from the central phase node 72 to the third phase source node 77. The third phase group 56 includes a third tertiary parallel circuit 50 of the plurality of winding sets 30 (e.g., C31, C32, C33, C34, C35, C36) connected in series with one another from the central phase node 72 to the third phase source node 77. Circuits 46, 48, 50 of the third phase group 56 are in parallel with one another. Each of the phase source nodes 74, 76, 77 can be connected to a controller and/or an electrical power supply (not shown) to power the electric machine 20.

FIG. 5B is similar to the diagram of FIG. 5A, but with an alternative circuit naming scheme. In the alternative circuit naming scheme the parallel circuit 34 is specified by two numeric digits after the phase letter (A, B, or C). The winding set 30 is specified by a single numeric digit separated from the parallel circuit 34 number by a comma. For example, winding "A16" in the naming scheme of FIG. 5A corresponds to winding "A11,2" in the naming scheme of FIG. 5B.

The first phase group 52 has a first phase group resistance and the second phase group 54 has a second phase group resistance and the third phase group 56 has a third phase group resistance. The resistances in each of the circuits 34, 36, 38, 40, 42, 44, 46, 48, 50 of the phase groups 52, 54, 56 are equal as a result of the manner in which the phase conductors 28 are connected and laid in the plurality of stator slots 26. Specifically, as best shown in FIGS. 6 and 7A-7B, the equal phase group resistances are advantageously accomplished because the first phase group 52 and the second phase group 54 and the third phase group 56 of the plurality of circuits 34, 36, 38, 40, 42, 44, 46, 48, 50 are each arranged within the plurality of layers 66 in the plurality of stator slots 26 with balanced quantities of the same slots 70 and the shared slots 68 for reducing stator 22 losses at high rotational speeds of the rotor 58 relative to the stator 22. More specifically, each of the primary parallel circuits 34, 40, 46, secondary parallel circuits 36, 42, 48, and tertiary parallel circuits 38, 44, 50 for each of the phase groups 52, 54, 56 has the same number of shared slots 68 and the same number of same slots 70 (i.e., each of the primary parallel circuits 34, 40, 46, secondary parallel circuits 36, 42, 48, and tertiary parallel circuits 38, 44, 50 for each of the phase groups 52, 54, 56 extends through an equal quantity of shared slots 68 and an equal quantity of same slots 70), resulting in no circulating current. According to an aspect, each of the primary parallel circuits 34, 40, 46, each of the secondary parallel circuits 36, 42, 48, and each of tertiary parallel circuits 38, 44, 50 has twelve (12) shared slots 68 and twenty four (24) same slots 70.

As discussed above, the plurality of circuits 34, 36, 38, 40, 42, 44, 46, 48, 50 each include the plurality of hairpin conductors 32 (e.g., three (3) hairpin conductors 32) interconnected with one another (e.g., formed wound). Specifically, each of the plurality of hairpin conductors 32 has a pair of legs 78 and each of the pair of legs 78 is separately disposed in one of the plurality of stator slots 26 to define a pitch. So, the pitch is a number of the plurality of stator slots 26 spanned by one of the pair of legs 78. The hairpin conductors 32 are connected together as shown in FIG. 8 comprise the winding set 30. In the first example embodiment, the plurality of winding sets 30 each includes the hairpin conductors 32 forming three coils. In other words, each of the plurality of circuits 34, 36, 38, 40, 42, 44, 46, 48, 50 passes back and forth through the plurality of stator slots 26 six times. Positive (+) indicates current into the paper and negative (−) current out of the paper with reference to FIG. 4.

Figure 9A:
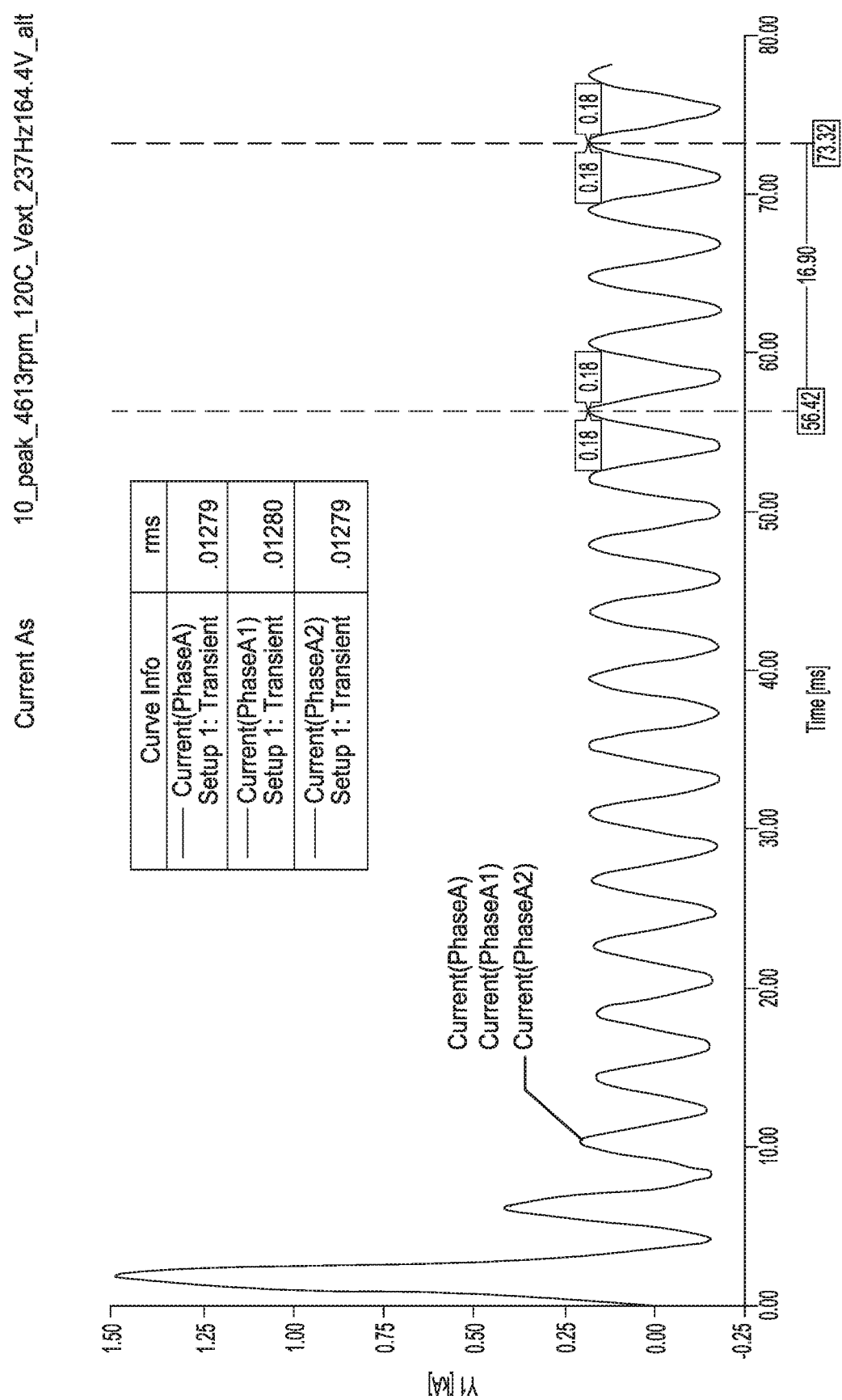
FIGS. 9A-9C illustrate simulated currents within each of the plurality of phase conductors for the first example embodiment of the electric machine according to aspects of the disclosure.
Figure 9B:
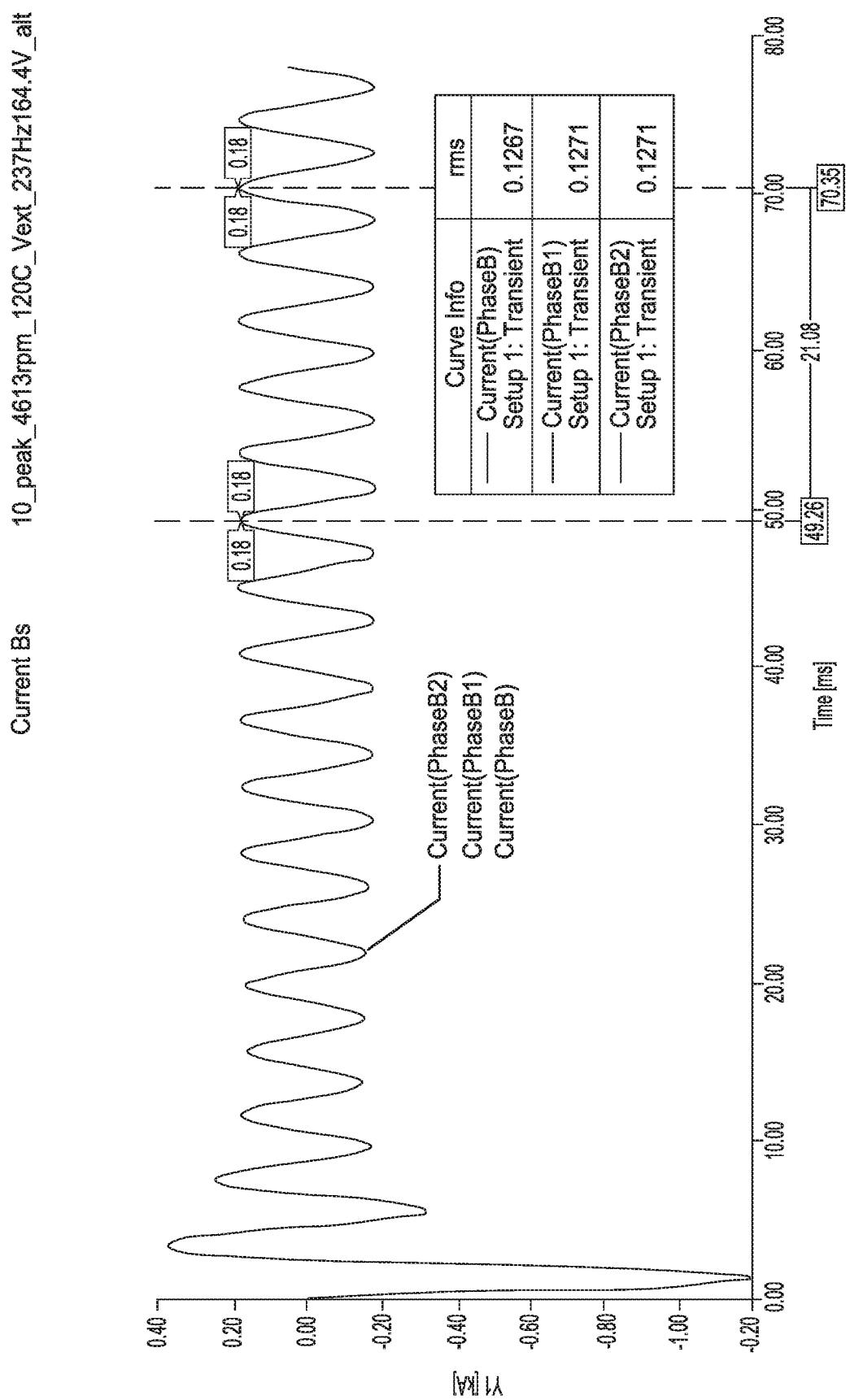
Figure 9C:
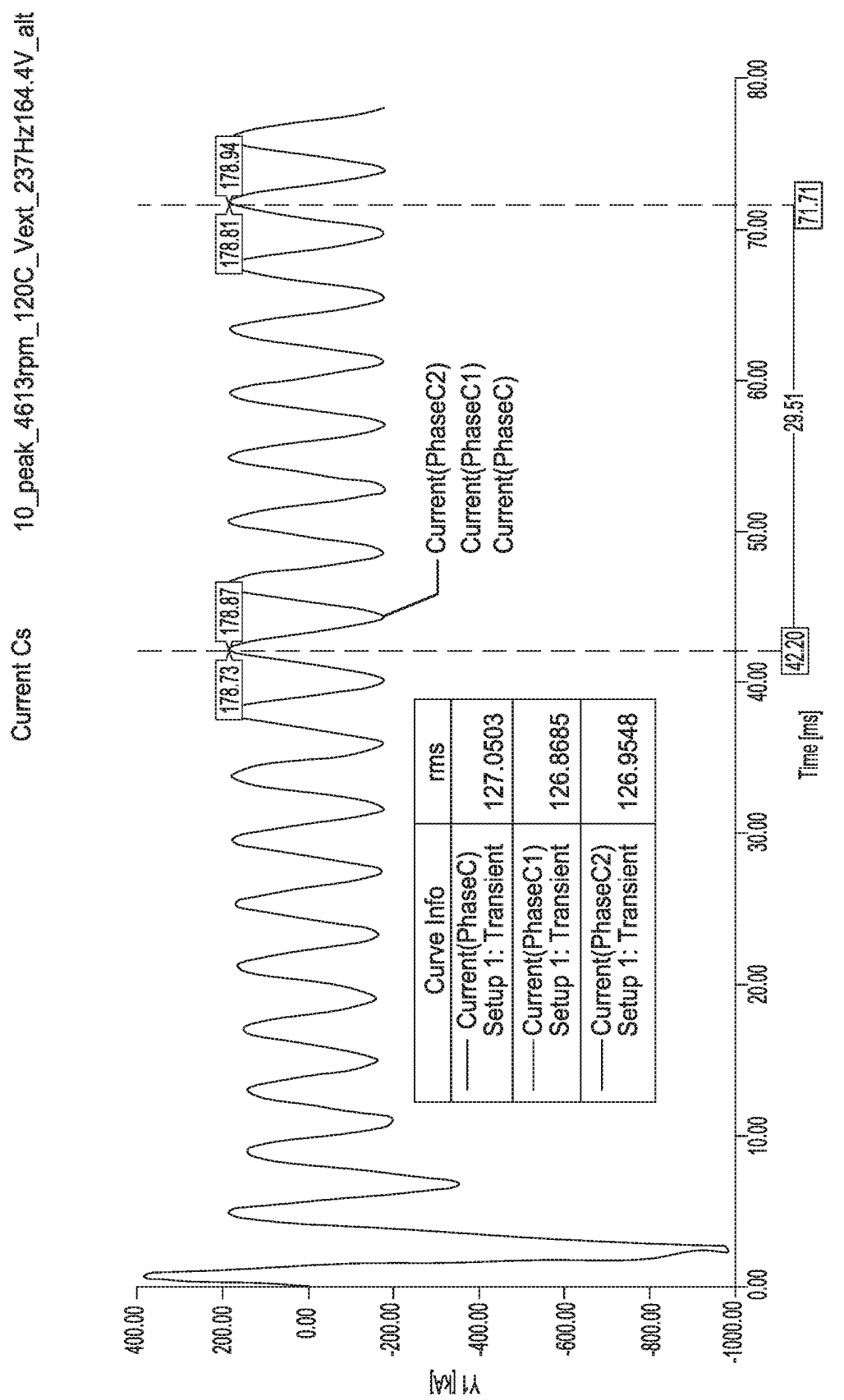
Figure 10:
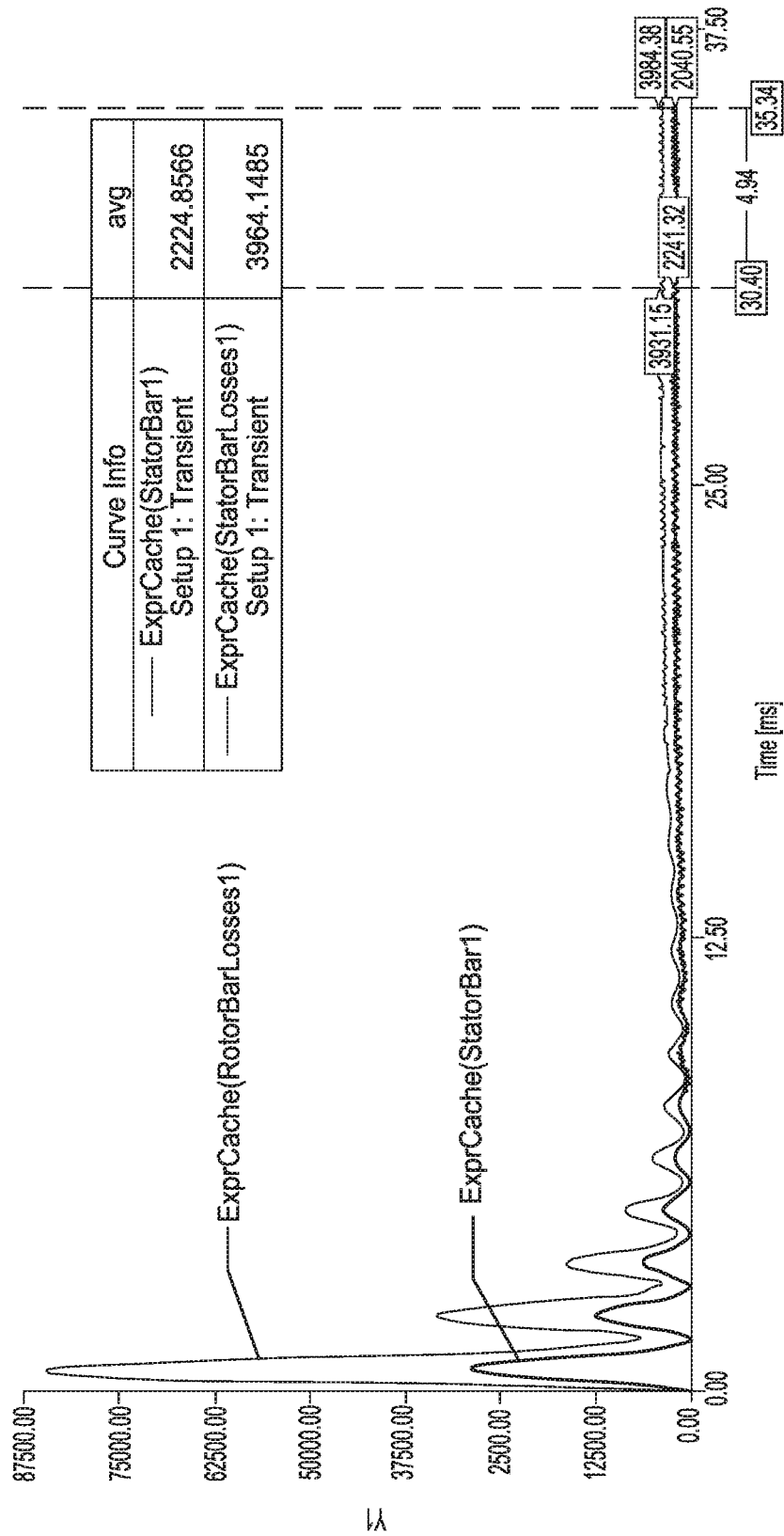
FIG. 10 illustrates simulated losses in the stator and the rotor for the first example embodiment of the electric machine according to aspects of the disclosure.
Figure 11:
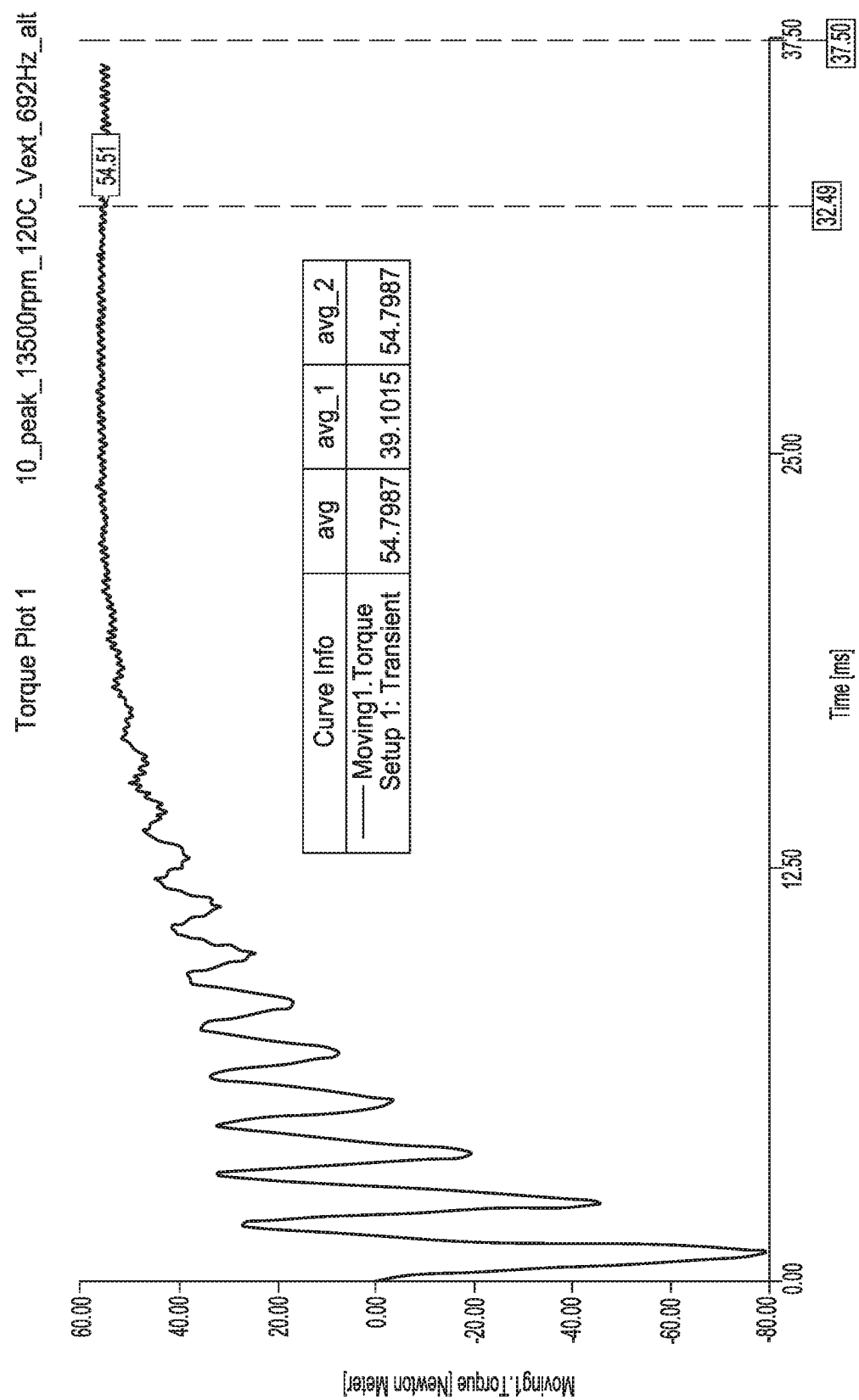
FIG. 11 illustrates a simulated torque of the first example embodiment of the electric machine according to aspects of the disclosure.

As best shown in FIGS. 9A-9C, simulation results indicate that each of the groups of three parallel circuits 34, 36, 38, 40, 42, 44, 46, 48, 50 of each phase group (i.e., first phase group 52, second phase group 54, and third phase group 56) of the first example embodiment of the electric machine 20 advantageously carry the same amount of steady state current, constituting no circulating current within the parallel circuits 34, 36, 38, 40, 42, 44, 46, 48, 50. Similarly, FIG. 10 shows that the electrical losses in the stator 22 and in the rotor 58 are very low as a result Therefore, as best in FIG. 11, the first example embodiment of the electric machine 20 can produce higher torque than if the first phase group 52 and the second phase group 54 and the third phase group 56 of the plurality of circuits 34, 36, 38, 40, 42, 44, 46, 48, 50 were arranged within the plurality of layers 66 in the plurality of stator slots 26 without balanced quantities of the same slots 70 and the shared slots 68.

Figure 12:
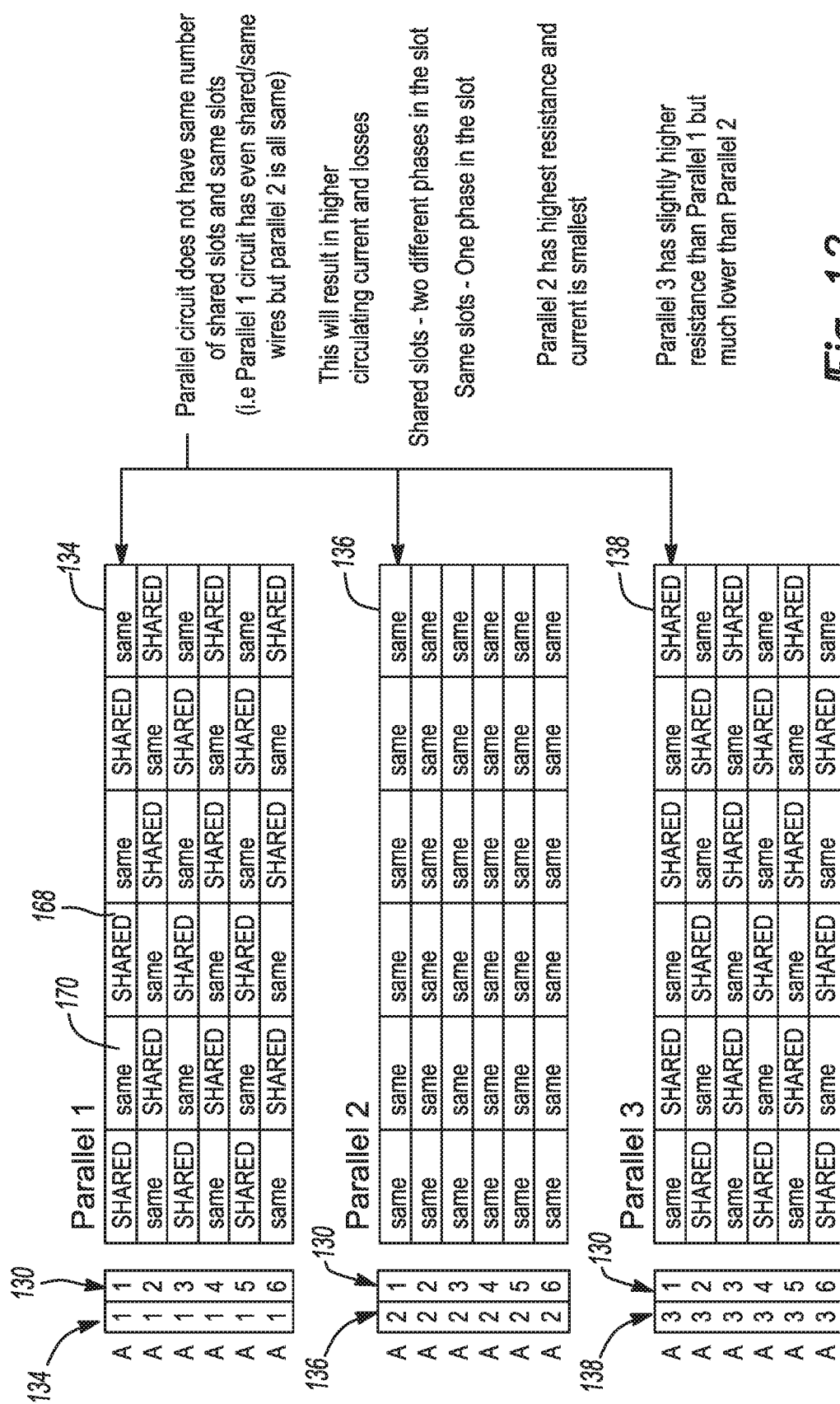

As best shown in FIGS. 12 and 13A-13B, an example second embodiment of the electric machine 120 is provided, including numerals showing like features of the first example embodiment separated by a factor of 100. The second example embodiment of the electric machine 120 differs from the first example embodiment, as the first phase group resistance and the second phase group resistance and the third phase group resistance are not equal to one another. Specifically, as shown in FIG. 12, each of the primary parallel circuits 134, 140, 146 (i.e., Parallel 1), secondary parallel circuits 136, 142, 148 (i.e., Parallel 2), and tertiary parallel circuits 138, 144, 150 (i.e., Parallel 3) for each of the phases do not have the same number of shared slots 168 and same slots 170, resulting in higher circulating current and losses. For example, Parallel 2 has the highest resistance and lowest current, while Parallel 3 has a slightly higher resistance than Parallel 1, but much lower than Parallel 2. So, unlike the first example embodiment of the electric machine 20, the first phase group resistance and second phase group resistance and third phase group resistance of the second example embodiment of the electric machine 120 are not all equal. The unequal phase group resistances result from the fact that the first phase group 152 and the second phase group 154 and the third phase group 156 of the plurality of circuits 134, 136, 138, 140, 142, 144, 146, 148, 150 are each arranged within the plurality of layers 166 in the plurality of stator slots 126 with unbalanced quantities of the same slots 170 and the shared slots 168.

Figure 14A:
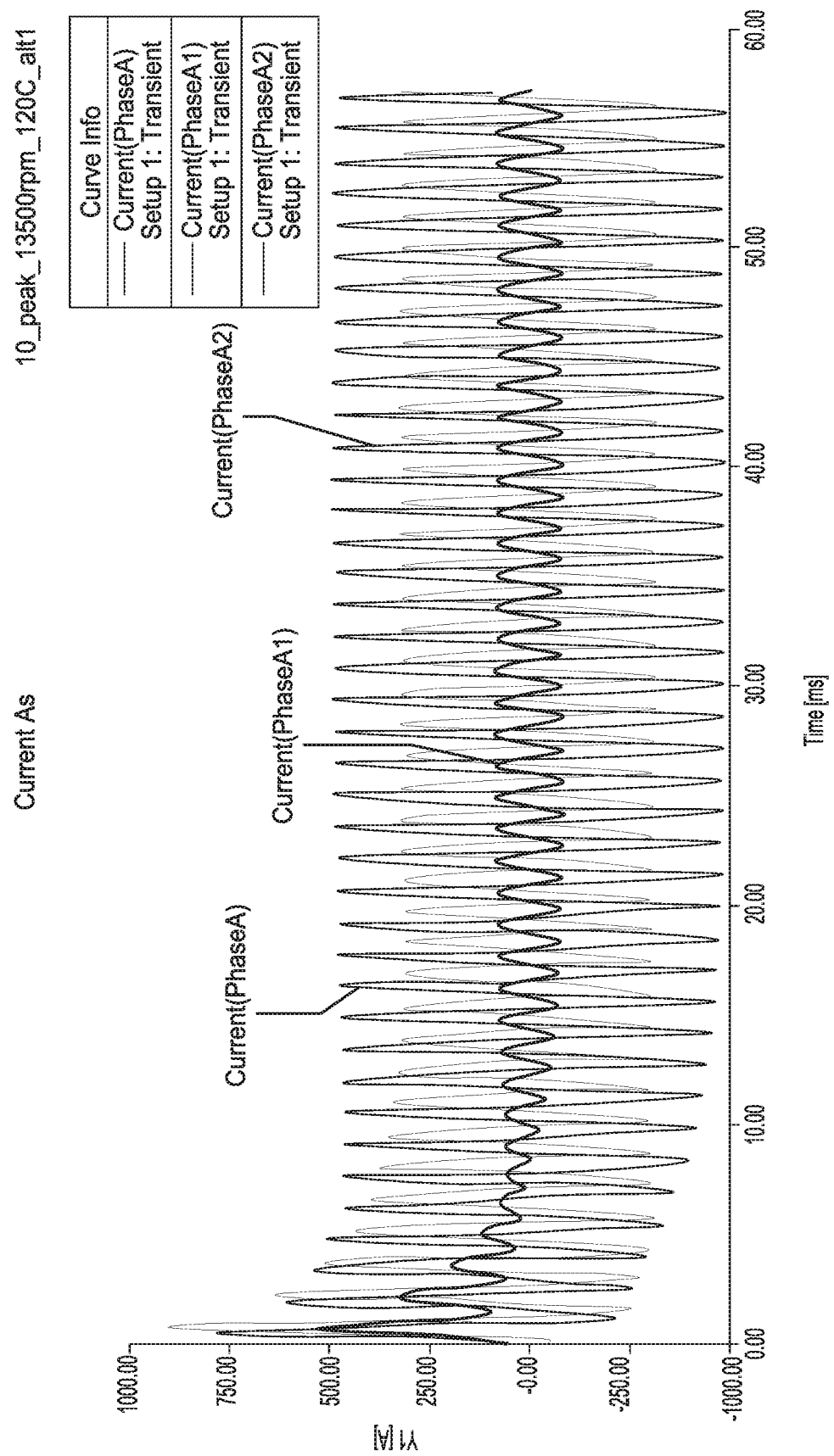
FIGS. 14A-14C illustrate simulated currents within each of the plurality of phase conductors for the second example embodiment of the electric machine according to aspects of the disclosure.
Figure 14B:
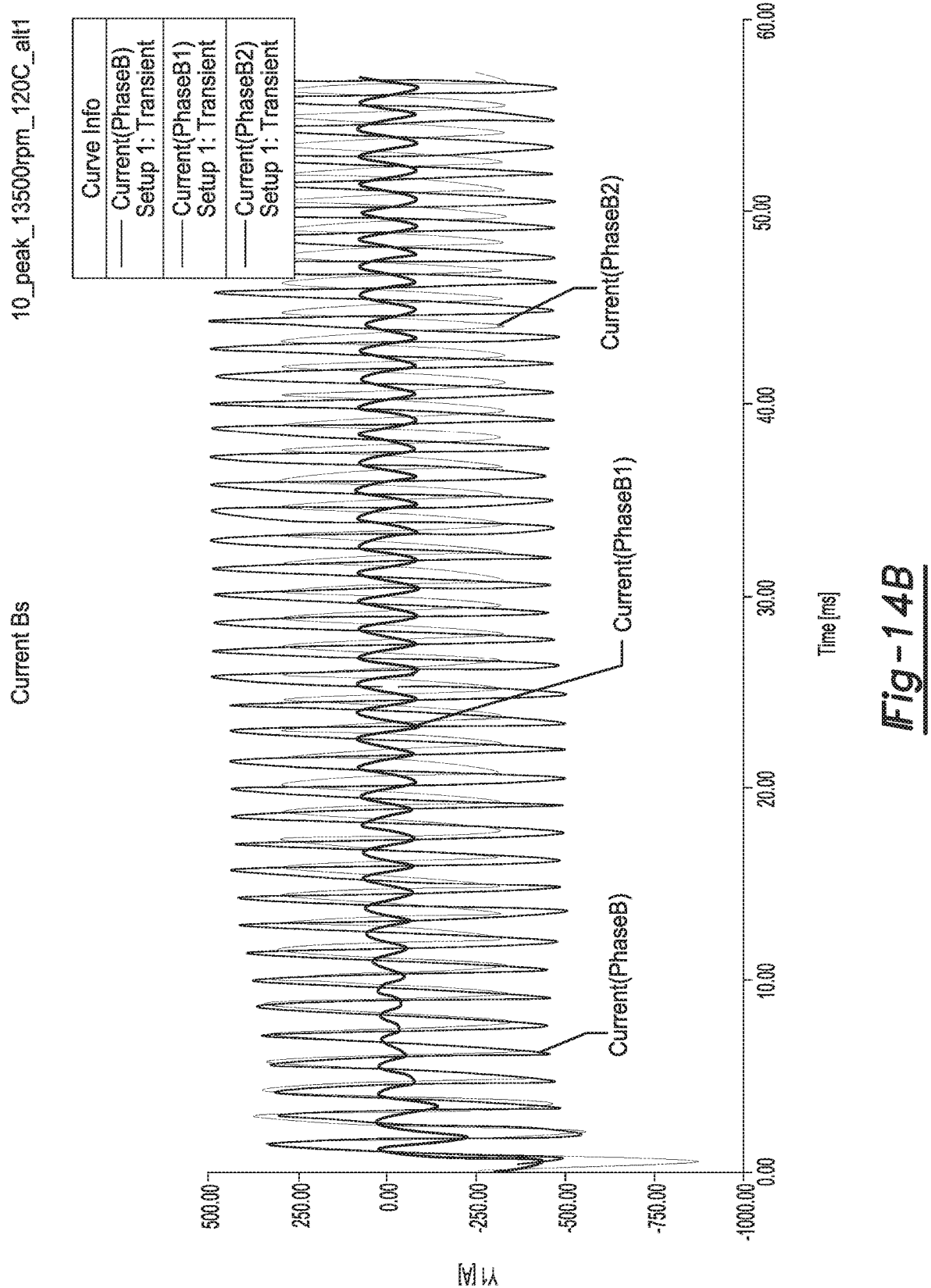
Figure 14C:
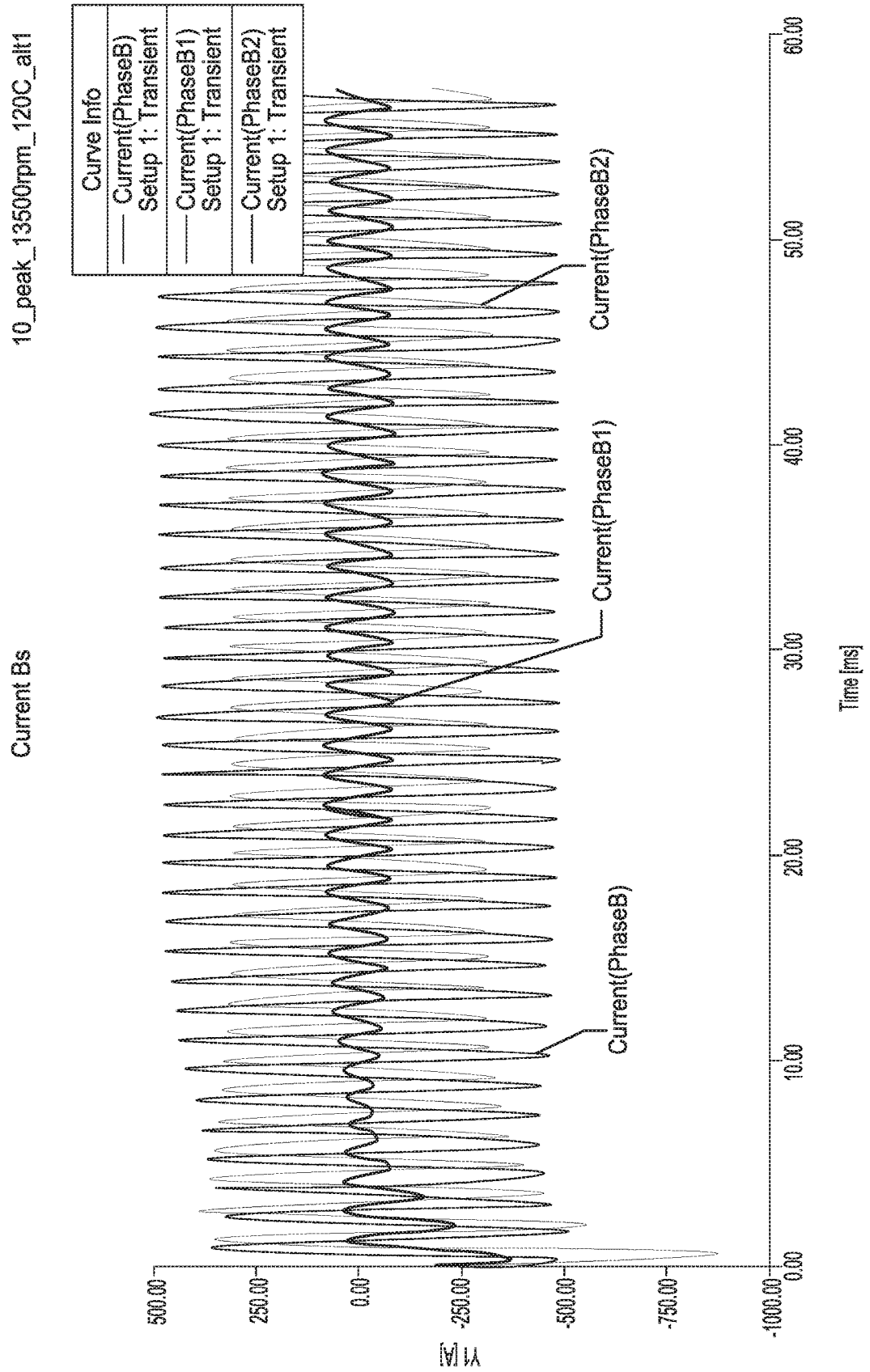
Figure 15:
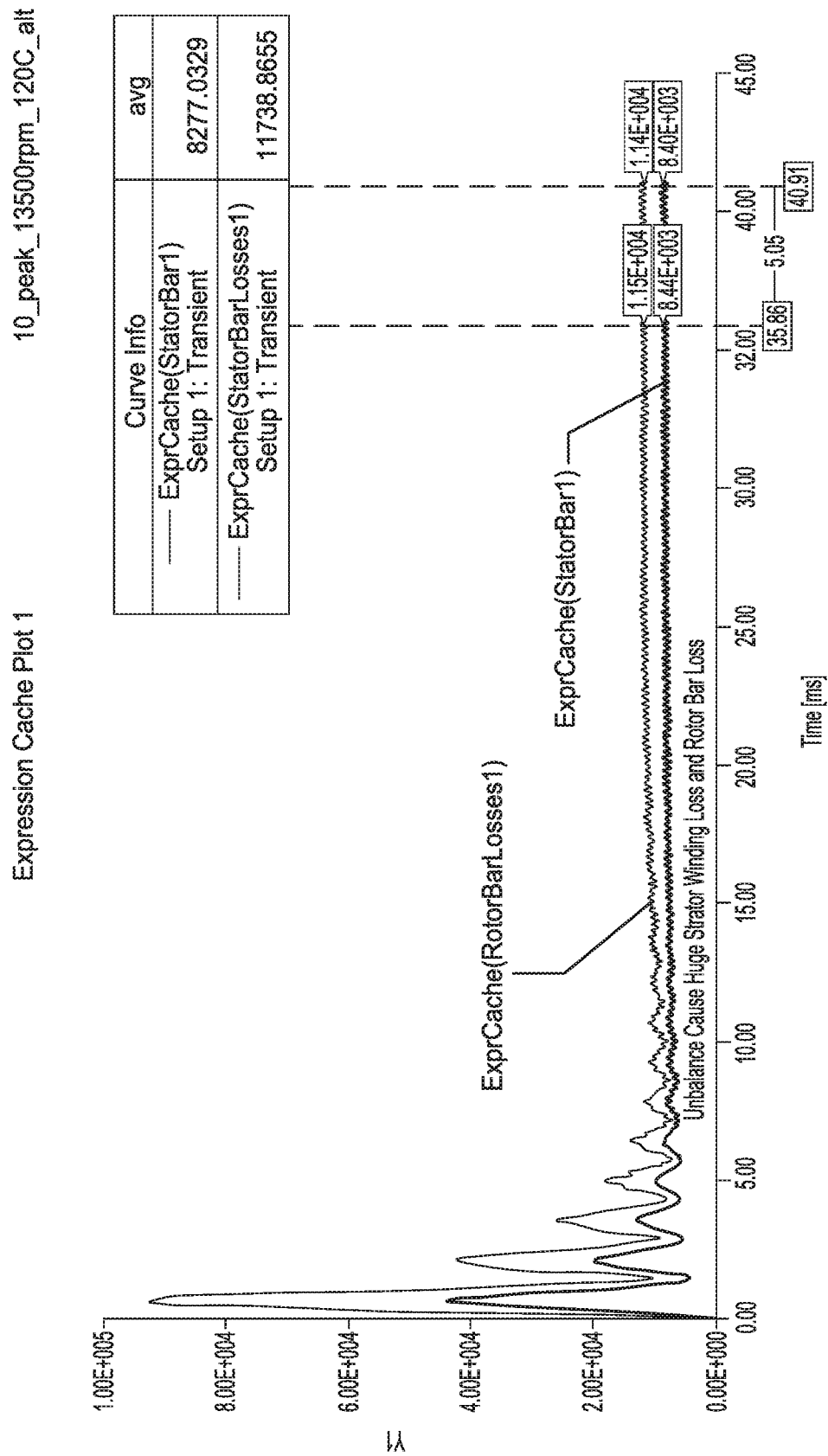
FIG. 15 illustrates simulated losses in the stator and the rotor for the second example embodiment of the electric machine according to aspects of the disclosure.
Figure 16:
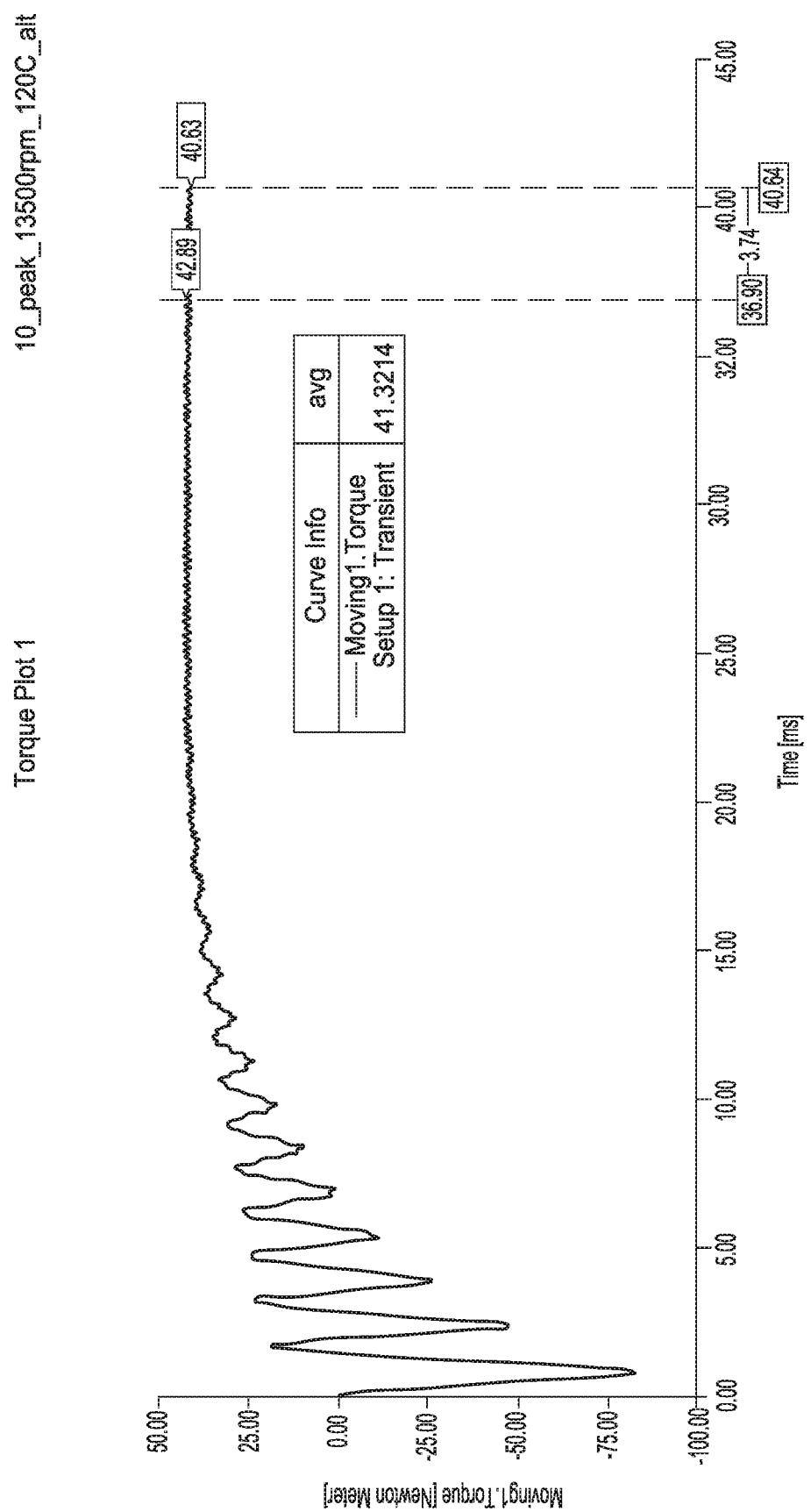
FIG. 16 illustrates a simulated torque of the second example embodiment of the electric machine according to aspects of the disclosure.

Consequently, as best shown in FIGS. 14A-14C, simulation results indicate that each of the groups of three parallel circuits 134, 136, 138, 140, 142, 144, 146, 148, 150 (i.e., first phase group 152, second phase group 154, and third phase group 156) of the second example embodiment of the electric machine 120 do not carry the same amount of current. FIG. 15 shows that the electrical losses in the stator 122 and in the rotor 158 are comparatively higher than those of the first example embodiment of the electric machine 20 as a result of the unequal phase group resistances resulting from the unbalanced quantities of same slots 170 and shared slots 168. Thus, as best shown in FIG. 16, the second example embodiment of the electric machine 120 produces comparatively lower torque (compared to the first example embodiment of the electric machine 20), because the first phase group 152 and the second phase group 154 and the third phase group 156 of the plurality of circuits 134, 136, 138, 140, 142, 144, 146, 148, 150 are not arranged within the plurality of layers 166 in the plurality of stator slots 126 with balanced quantities of the same slots 170 and the shared slots 168. The lower torque production indicates the machine 120 underperforms and does not meet the required torque value.

Figure 17:
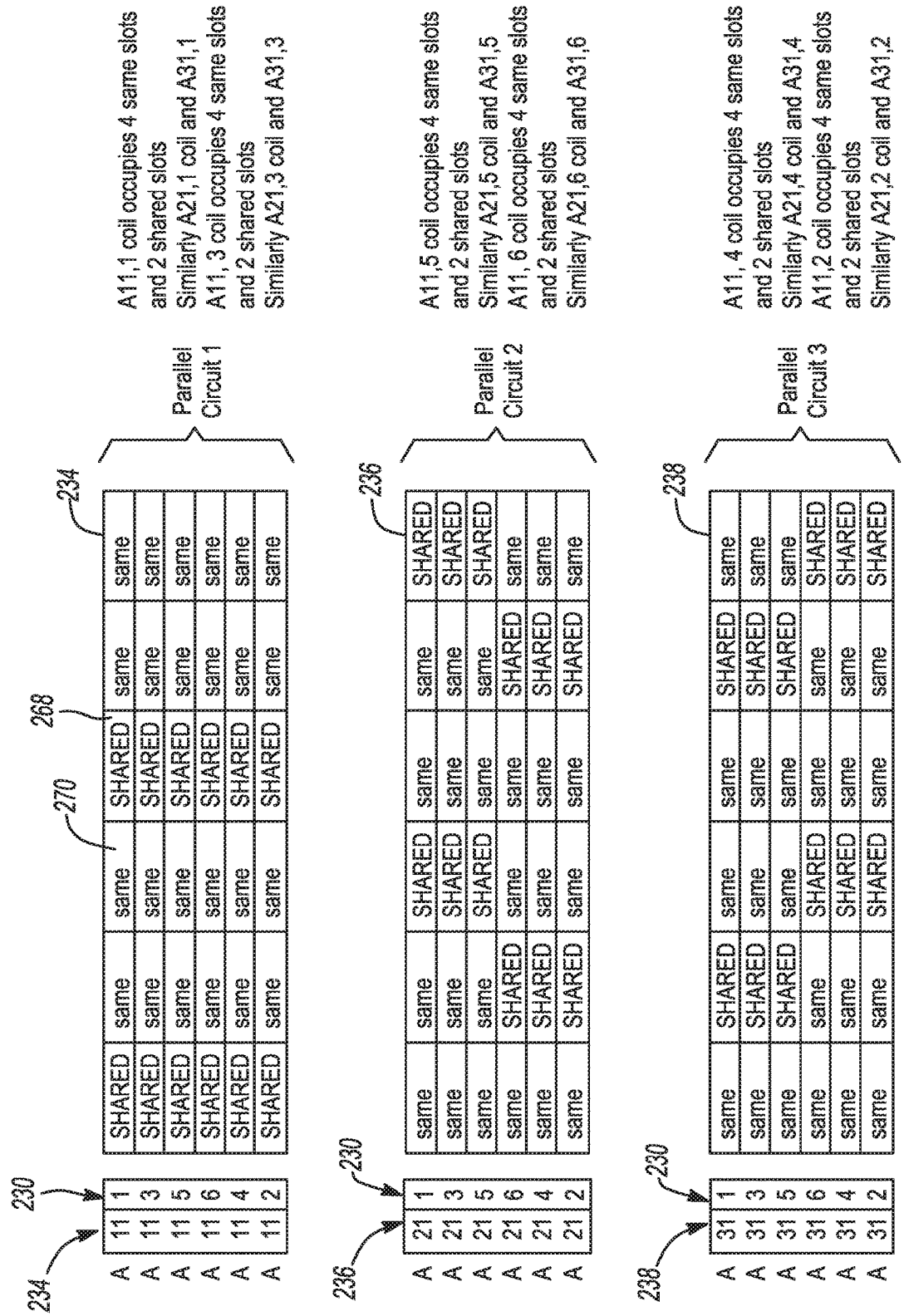

As best shown in FIGS. 17-18, an example third embodiment of the electric machine 220 is provided, including numerals showing like features of the first example embodiment of the electric machine 20 separated by a factor of 200. The third example embodiment incorporates an alternative winding layout from the example embodiment illustrated in FIGS. 6-7. FIG. 17 illustrates A-phase winding sets 230 of circuits 234, 236, and 238 with balanced quantities of the same slots 270 and the shared slots 268. In more detail, the plurality of winding sets 230 each extend through a first predetermined quantity of the same slots 270 and a second predetermined quantity of the shared slots 268. The second predetermined quantity of the shared slots 268 is less than the first predetermined quantity of the same slots 270. The second predetermined quantity of the shared slots 268 is one half the first predetermined quantity of the same slots 270. As shown, the second predetermined quantity of the shared slots 268 is two (2) shared slots 268 and the first predetermined quantity of the same slots 270 is four (4) same slots 270. FIGS. 17 and 18 employ the alternative circuit nomenclature introduced in FIG. 5B. FIG. 18 highlights parallel circuit 234 A11, as an example, with each of the six winding sets 230 thereof (A11,1; A11,2, A11,3, A11,4, A11,5, and A11,6) being circled. FIG. 17 is analogous to FIG. 6, as described above, and FIG. 18 is analogous to FIGS. 7A-7B. The third embodiment, also called "Optimized Winding Layout 2", provides the same advantages as the example embodiment of FIGS. 6 and 7A-7B, but with a different winding layout for improved manufacturability.

Clearly, changes may be made to what is described and illustrated herein without, however, departing from the scope defined in the accompanying claims. The electric machine disclosed may operate in a vehicle or other application utilizing an induction motor, for example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the example electric machine can likewise be implemented into many other systems to control one or more operations and/or functions.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. An electric machine comprising:
   a stator extending annularly about and along an axis and having a substantially cylindrical interior defining a rotor chamber and a plurality of stator slots disposed circumferentially and in a spaced relationship about said stator;
   said stator includes a plurality of phase groups each including a plurality of circuits;
   said plurality of circuits each including a plurality of winding sets of a plurality of phase conductors connected in series for carrying an alternating current voltage;
   each of said plurality of phase conductors of one of said plurality of phase groups carrying the alternating current voltage with a phase difference compared to said plurality of phase conductors of another one of said plurality of phase groups;
   a rotor extending axially and disposed in said rotor chamber for rotating relative to said stator in response to the alternating current voltage carried by each of said plurality of phase conductors;
   said plurality of phase conductors laid in a plurality of layers of said plurality of stator slots, wherein said plurality of stator slots that include at least one of said plurality of phase conductors carrying the alternating current voltage with another one of said plurality of phase conductors carrying the alternating current voltage with the phase difference are shared slots and said plurality of stator slots that include said plurality of phase conductors carrying the alternating current voltage with another one of said plurality of phase conductors carrying the alternating current voltage with no phase difference are same slots; and
   said plurality of circuits each arranged within said plurality of layers in said plurality of stator slots with balanced quantities of said same slots and said shared slots for reducing stator losses at high rotational speeds of said rotor relative to said stator wherein said plurality of phase groups includes a first phase group including a first primary parallel circuit of said plurality of winding sets connected in series with one another from a central phase node to a first phase source node and a first secondary parallel circuit of said plurality of winding sets connected in series with one another from said central phase node to said first phase source node and a first tertiary parallel circuit of said plurality of winding sets connected in series with one another from said central phase node to said first phase source node and said plurality of phase groups includes a second phase group including a second primary parallel circuit of said plurality of winding sets connected in series with one another from said central phase node to a second phase source node and a second secondary parallel circuit of said plurality of winding sets connected in series with one another from said central phase node to said second phase source node and a second tertiary parallel circuit of said plurality of winding sets connected in series with one another from said central phase node to said second phase source node and said plurality of phase groups includes a third phase group including a third primary parallel circuit of said plurality of winding sets connected in series with one another from said central phase node to a third phase source node and a third secondary parallel circuit of said plurality of winding sets connected in series with one another from said central phase node to said third phase source node and a third tertiary parallel circuit of said plurality of winding sets connected in series with one another from said central phase node to said third phase source node;

wherein said plurality of winding sets for each of said first primary parallel circuit and said second primary parallel circuit and said third primary parallel circuit and said first secondary parallel circuit and said second secondary parallel circuit and said third secondary parallel circuit and said first tertiary parallel circuit and said second tertiary parallel circuit and said third tertiary parallel circuit includes six winding sets.

2. The electric machine as set forth in claim 1, wherein said first primary parallel circuit and said second primary parallel circuit and said third primary parallel circuit and said first secondary parallel circuit and said second secondary parallel circuit and said third secondary parallel circuit and said first tertiary parallel circuit and said second tertiary parallel circuit and said third tertiary parallel circuit each extend through an equal number of said shared slots and an equal quantity of said same slots.

3. The electric machine as set forth in claim 1, wherein said first primary parallel circuit and said second primary parallel circuit and said third primary parallel circuit and said first secondary parallel circuit and said second secondary parallel circuit and said third secondary parallel circuit and said first tertiary parallel circuit and said second tertiary parallel circuit and said third tertiary parallel circuit each extend through twelve of said shared slots and twenty four of said same slots.

4. An electric machine comprising:
a stator extending annularly about and along an axis and having a substantially cylindrical interior defining a rotor chamber and a plurality of stator slots disposed circumferentially and in a spaced relationship about said stator;

said stator includes a plurality of phase groups each including a plurality of circuits;

said plurality of circuits each including a plurality of winding sets of a plurality of phase conductors connected in series for carrying an alternating current voltage;

a rotor extending axially and disposed in said rotor chamber for rotating relative to said stator in response to the alternating current voltage carried by each of said plurality of phase conductors;

said plurality of phase conductors laid in a plurality of layers of said plurality of stator slots; and said plurality of phase groups includes a first phase group having a first phase resistance and a second phase group having a second phase resistance and a third phase group having a third phase resistance and the first phase resistance and the second phase resistance and the third phase resistance are all equal wherein said plurality of phase conductors each includes a plurality of hairpin conductors interconnected with one another;

wherein said plurality of hairpin conductors each have a pair of legs and each of said pair of legs is separately disposed in one of said plurality of stator slots to define a pitch being a number of said plurality of slots spanned by one of said pair of legs;

wherein said second predetermined quantity of said shared slots is two shared slots and said first predetermined quantity of said same slots is four same slots.

5. The electric motor as set forth in claim 4, wherein said plurality of phase groups are each connected to one another in a Y configuration.

6. The electric machine as set forth in claim 4, wherein said second predetermined quantity of said shared slots is one half said first predetermined quantity of said same slots.

7. The electric machine as set forth in claim 4, wherein said plurality of phase conductors extend through said stator slots to define a plurality of North poles and a plurality of South poles.

8. An electric machine comprising:
a stator extending annularly about and along an axis and having a substantially cylindrical interior defining a rotor chamber and a plurality of stator slots disposed circumferentially and in a spaced relationship about said stator;

said stator includes a plurality of phase groups each including a plurality of circuits;

said plurality of circuits each including a plurality of winding sets of a plurality of phase conductors connected in series for carrying an alternating current voltage;

a rotor extending axially and disposed in said rotor chamber for rotating relative to said stator in response to the alternating current voltage carried by each of said plurality of phase conductors;

said plurality of phase conductors laid in a plurality of layers of said plurality of stator slots; and said plurality of phase groups includes a first phase group having a first phase resistance and a second phase group having a second phase resistance and a third phase group having a third phase resistance and the first phase resistance and the second phase resistance and the third phase resistance are all equal wherein said plurality of phase conductors each includes a plurality of hairpin conductors interconnected with one another;

wherein said plurality of hairpin conductors includes three hairpin conductors forming three coils.

9. The electric motor as set forth in claim 8, wherein said plurality of hairpin conductors each have a pair of legs and each of said pair of legs is separately disposed in one of said plurality of stator slots to define a pitch being a number of said plurality of slots spanned by one of said pair of legs.

10. An electric machine comprising:
- a stator extending annularly about and along an axis and having a substantially cylindrical interior defining a rotor chamber and a plurality of stator slots disposed circumferentially and in a spaced relationship about said stator;
- said stator includes a plurality of phase groups each including a plurality of circuits;
- said plurality of circuits each including a plurality of winding sets of a plurality of phase conductors connected in series for carrying an alternating current voltage;
- a rotor extending axially and disposed in said rotor chamber for rotating relative to said stator in response to the alternating current voltage carried by each of said plurality of phase conductors;
- said plurality of phase conductors laid in a plurality of layers of said plurality of stator slots; and
- said plurality of phase groups includes a first phase group having a first phase resistance and a second phase group having a second phase resistance and a third phase group having a third phase resistance and the first phase resistance and the second phase resistance and the third phase resistance are all equal
- wherein said plurality of phase conductors each includes a plurality of hairpin conductors interconnected with one another;
- wherein said plurality of hairpin conductors each have a pair of legs and each of said pair of legs is separately disposed in one of said plurality of stator slots to define a pitch being a number of said plurality of slots spanned by one of said pair of legs;
- wherein said plurality of phase conductors extend through said stator slots to define a plurality of North poles and a plurality of South poles;
- wherein said plurality of North poles includes three North poles and said plurality of South poles includes three South poles.

* * * * *